(12) United States Patent
Schmelter et al.

(10) Patent No.: US 8,336,033 B2
(45) Date of Patent: Dec. 18, 2012

(54) METHOD AND SYSTEM FOR GENERATING A HIERARCHICAL TREE REPRESENTING STACK TRACES

(75) Inventors: Ralf Schmelter, Wiesloch (DE); Michael Wintergerst, Rauenberg (DE); Arno Zeller, Mannheim (DE)

(73) Assignee: SAP AG, Walldorf (DE)

( * ) Notice: Subject to any disclaimer, the term of this patent is extended or adjusted under 35 U.S.C. 154(b) by 1395 days.

(21) Appl. No.: 11/731,360

(22) Filed: Mar. 30, 2007

(65) Prior Publication Data

US 2008/0244531 A1 Oct. 2, 2008

(51) Int. Cl.
*G06F 9/44* (2006.01)
(52) U.S. Cl. .................. 717/131; 717/127; 717/128
(58) Field of Classification Search .................. None
See application file for complete search history.

(56) References Cited

U.S. PATENT DOCUMENTS

| | | | | |
|---|---|---|---|---|
| 5,408,650 | A | * | 4/1995 | Arsenault ............... 717/128 |
| 5,847,972 | A | * | 12/1998 | Eick et al. ............... 709/246 |
| 5,881,287 | A | | 3/1999 | Mast |
| 5,918,053 | A | | 6/1999 | Graham |
| 6,002,872 | A | * | 12/1999 | Alexander et al. ........... 717/127 |
| 6,055,492 | A | * | 4/2000 | Alexander et al. ........... 702/179 |
| 6,071,317 | A | | 6/2000 | Nagel |
| 6,158,024 | A | * | 12/2000 | Mandal ................ 714/37 |
| 6,226,653 | B1 | | 5/2001 | Alpern et al. |
| 6,308,319 | B1 | | 10/2001 | Bush et al. |
| 6,317,869 | B1 | | 11/2001 | Adl-Tabatabai et al. |
| 6,351,843 | B1 | | 2/2002 | Berkley et al. |
| 6,363,521 | B1 | * | 3/2002 | Yasue et al. ............... 717/128 |
| 6,393,439 | B1 | | 5/2002 | Houldsworth et al. |
| 6,493,868 | B1 | | 12/2002 | DaSilva et al. |
| 6,539,501 | B1 | | 3/2003 | Edwards |
| 6,658,652 | B1 | | 12/2003 | Alexander, III et al. |
| 6,662,362 | B1 | | 12/2003 | Arora et al. |
| 6,721,941 | B1 | * | 4/2004 | Morshed et al. ............... 717/127 |
| 6,792,460 | B2 | | 9/2004 | Oulu et al. |
| 6,802,054 | B2 | | 10/2004 | Faraj |
| 6,826,583 | B1 | | 11/2004 | Flood et al. |
| 6,839,725 | B2 | | 1/2005 | Agesen et al. |
| 6,857,120 | B1 | * | 2/2005 | Arnold et al. ................. 717/157 |

(Continued)

OTHER PUBLICATIONS

Sameer Shende et al., "Dynamic Performance Callstack Sampling: Merging TAU and DAQV", University of Oregon, 2004, <http://www.google.com/url?sa=t&rct=j&q=&esrc=s&frm=1&source=web&cd=1&ved=0CHoQFjAA&url=>, pp. 1-10.*

(Continued)

*Primary Examiner* — Thuy Dao
*Assistant Examiner* — Samuel Hayim
(74) *Attorney, Agent, or Firm* — Blakely, Sokoloff, Taylor & Zafman LLP

(57) ABSTRACT

A system and method are provided to generate a hierarchical tree representing stack traces. In one embodiment, stack trace elements in a plurality of stack traces relating to profiling of an application executing at a first virtual machine are identified, the stack trace elements relating to profiling events being detected during the profiling of the application. The identified stack trace elements are sorted as one of parent elements; parent/child elements, or child elements based on a number of times a stack trace element has appeared in the plurality of stack traces and its relationship with other elements in the plurality of stack traces. A tree having nodes to represent the stack trace elements is created such that that the child elements branch from the parent/child elements or the parent elements, and the parent/child elements branch from the parent elements.

21 Claims, 13 Drawing Sheets

U.S. PATENT DOCUMENTS

| | | | |
|---|---|---|---|
| 6,871,272 B2 | 3/2005 | Butterworth | |
| 6,892,378 B2* | 5/2005 | Curtis et al. | 717/127 |
| 6,938,245 B1* | 8/2005 | Spertus et al. | 717/127 |
| 6,957,237 B1 | 10/2005 | Traversat et al. | |
| 6,971,097 B1 | 11/2005 | Wallman | |
| 7,007,270 B2 | 2/2006 | Martin et al. | |
| 7,035,884 B2 | 4/2006 | Garthwaite | |
| 7,058,928 B2* | 6/2006 | Wygodny et al. | 717/128 |
| 7,086,064 B1 | 8/2006 | Stevens | |
| 7,107,578 B1 | 9/2006 | Alpern | |
| 7,114,150 B2* | 9/2006 | Dimpsey et al. | 717/131 |
| 7,275,241 B2 | 9/2007 | Choi et al. | |
| 7,293,260 B1* | 11/2007 | Dmitriev | 717/130 |
| 7,313,661 B1 | 12/2007 | Emitriev | |
| 7,320,125 B2* | 1/2008 | Elliott et al. | 717/131 |
| 7,325,106 B1 | 1/2008 | Dmitriev et al. | |
| 7,350,194 B1* | 3/2008 | Alpern | 717/124 |
| 7,428,560 B1 | 9/2008 | Detlefs et al. | |
| 7,458,062 B2 | 11/2008 | Coulthard et al. | |
| 7,493,601 B2* | 2/2009 | Gimness et al. | 717/131 |
| 7,676,801 B1 | 3/2010 | Garthwaite | |
| 7,685,575 B1 | 3/2010 | Fareed | |
| 7,765,528 B2* | 7/2010 | Findeisen et al. | 717/131 |
| 7,823,129 B2* | 10/2010 | Dimpsey et al. | 717/124 |
| 2001/0037336 A1 | 11/2001 | Sauntry et al. | |
| 2002/0019716 A1 | 2/2002 | Agesen et al. | |
| 2002/0066081 A1* | 5/2002 | Duesterwald et al. | 717/128 |
| 2002/0107879 A1 | 8/2002 | Arnold et al. | |
| 2002/0120823 A1 | 8/2002 | Kolodner et al. | |
| 2003/0056199 A1 | 3/2003 | Li et al. | |
| 2003/0056200 A1 | 3/2003 | Li et al. | |
| 2003/0088854 A1* | 5/2003 | Wygodny et al. | 717/130 |
| 2003/0233634 A1 | 12/2003 | Carrez et al. | |
| 2004/0003119 A1 | 1/2004 | Munir et al. | |
| 2004/0054984 A1* | 3/2004 | Chong et al. | 717/103 |
| 2004/0068560 A1 | 4/2004 | Oulu et al. | |
| 2004/0073764 A1 | 4/2004 | Andreasson | |
| 2004/0078381 A1 | 4/2004 | Blandy et al. | |
| 2004/0111447 A1 | 6/2004 | Garthwaite | |
| 2004/0111451 A1 | 6/2004 | Garthwaite | |
| 2004/0133895 A1 | 7/2004 | Dahlstedt et al. | |
| 2004/0158589 A1 | 8/2004 | Liang et al. | |
| 2004/0158819 A1* | 8/2004 | Cuomo et al. | 717/128 |
| 2004/0177243 A1 | 9/2004 | Worley | |
| 2004/0205409 A1* | 10/2004 | Wu et al. | 714/38 |
| 2004/0210877 A1 | 10/2004 | Sluiman et al. | |
| 2004/0230956 A1 | 11/2004 | Cirne et al. | |
| 2005/0076265 A1* | 4/2005 | Hsu et al. | 714/27 |
| 2005/0081190 A1 | 4/2005 | Betancourt et al. | |
| 2005/0091646 A1 | 4/2005 | Chilimbi et al. | |
| 2005/0102673 A1* | 5/2005 | DeWitt et al. | 718/100 |
| 2005/0138623 A1 | 6/2005 | Fresko | |
| 2005/0172299 A1* | 8/2005 | Zhao et al. | 719/313 |
| 2005/0198088 A1 | 9/2005 | Subramoney et al. | |
| 2005/0240641 A1 | 10/2005 | Kimura et al. | |
| 2005/0261879 A1* | 11/2005 | Shrivastava et al. | 702/186 |
| 2006/0059453 A1 | 3/2006 | Kuck et al. | |
| 2006/0064687 A1 | 3/2006 | Dostert | |
| 2006/0129993 A1* | 6/2006 | Belisario et al. | 717/124 |
| 2006/0136530 A1* | 6/2006 | Rossmann | 707/206 |
| 2006/0143596 A1 | 6/2006 | Miyashita et al. | |
| 2006/0190930 A1 | 8/2006 | Hecht et al. | |
| 2006/0248131 A1 | 11/2006 | Marwinski et al. | |
| 2006/0248177 A1* | 11/2006 | Dostert et al. | 709/223 |
| 2007/0006168 A1* | 1/2007 | Dimpsey et al. | 717/130 |
| 2007/0016893 A1* | 1/2007 | Branda et al. | 717/127 |
| 2007/0027942 A1 | 2/2007 | Trotter | |
| 2007/0074170 A1 | 3/2007 | Rossmann | |
| 2007/0079307 A1* | 4/2007 | Dhawan et al. | 718/1 |
| 2007/0169003 A1* | 7/2007 | Branda et al. | 717/130 |
| 2008/0127107 A1 | 5/2008 | Kosche et al. | |
| 2008/0209404 A1 | 8/2008 | Brady | |
| 2008/0243968 A1 | 10/2008 | Schmelter et al. | |
| 2008/0243969 A1* | 10/2008 | Wintergerst et al. | 707/206 |
| 2008/0243970 A1 | 10/2008 | Schmelter et al. | |
| 2008/0244546 A1* | 10/2008 | Schmelter et al. | 717/158 |
| 2008/0244547 A1* | 10/2008 | Wintergerst et al. | 717/158 |

OTHER PUBLICATIONS

Zhen Liu et al., "Dynamic Learning of Automata from the Call Stack Log for Anomaly Detection", IEEE, 2005, <http://ieeexplore.ieee.org/stamp/stamp.jsp?tp=&arnumber=1428558>, pp. 1-6.*

Christoph Bockisch et al., "Efficient Control Flow Quantification", ACM, 2006, <http://delivery.acm.org/10.1145/1170000/1167484/p125-bockisch.pdf>, pp. 1-13.*

Non-Final Office Action for U.S. Appl. No. 11/731,499 Mailed Jul. 29, 2009; 12 pages.

Final Office Action for U.S. Appl. No. 11/731,267 Mailed Oct. 14, 2009, 11 Pages.

Non-Final Office Action for U.S. Appl. No. 11/731,267 Mailed Mar. 1, 2010, 14 Pages.

Non-Final Office Action for U.S. Appl. No. 12/638,500 Mailed Jul. 13, 2010, 14 Pages.

Final Office Action for U.S. Appl. No. 11/731,267 Mailed Jul. 15, 2010, 13 Pages.

Non-Final Office Action for U.S. Appl. No. 11/731,267 dated May 28, 2009; 15 pages.

Notice of Allowance for U.S. Appl. No. 11/731,267, Mailed Nov. 4, 2010, 17 pages.

Final Office Action for U.S. Appl. No. 12/638,500, Mailed Nov. 3, 2010, 17 pages, 17 Pages.

Non-Final Office Action for U.S. Appl. No. 11/731,397, Mailed Nov. 8, 2010, 14 pages.

Non-Final Office Action for U.S. Appl. No. 11/731,684, Mailed Nov. 26, 2010, 26 Pages.

Notice of Allowance for U.S. Appl. No. 12/638,500, Mailed Feb. 14, 2011, 9 pages.

Chilimbi, Trishul M., et al., "Low-Overhead Memory Leak Detection Using Adaptive Statistical Profiling", Matthias Hauswirth, Oct. 2003. *ACM. ASPLOS 2004.*, (Oct. 2004).

Gupta, Satich C., et al., "Java Memory Leaks—Catch me if you can", Aug. 16, 2005, *IBM*.

Hertz, Matthew, et al., "Error-free garbage collection traces: how to cheat and not get caught", Stephen M. Blackburn, J Eliot B Moss, Kathryn S. McKinley, Darko Stefanovi; vol. 30, Issue 1 (Jun. 2002) *ACM SIGMETRICS Performance Evaluation Review archive*, (Jun. 2002), 12 pages.

Sun Microsystems, "Simplified Guide to the Java 2 Platform, Enterprise Edition", 1999, *Sun Microsystems*.

Vaught, Andy, "Take Command: gprof, bprof and Time Profilers", May 1998, *Linux Journal*. Issue 49, (May 1998), 6 pages.

Non Final Office Action for U.S. Appl. No. 11/731,550 Mailed Feb. 17, 2011, 28 pages.

Final Office Action for U.S. Appl. No. 11/731,684, Mailed Apr. 26, 2011, 12 pages.

Final Office Action for U.S. Appl. No. 11/731,550, Mailed Jul. 8, 2011, 27 pages.

Non-Final Office Action for U.S. Appl. No. 11/731,501, Mailed Jul. 19, 2011, 18 pages.

Final Office Action for U.S. Appl. No. 11/731,397, Mailed Apr. 13, 2011, 13 pages.

Viswanathan, et al., "Java Virtual Machine Profiler Interface", [online] (Jan. 2000) IBM, *IBM Systems Journal*, vol. 39, No. 1, pp. 82-95, Retrieved From the Internet.

Final Office Action for U.S. Appl. No. 11/731,684, Mailed Aug. 17, 2012.

Notice of Allowance for U.S. Appl. No. 11/731,550, Mailed Sep. 12, 2012.

"The Java Virtual Machine Profiling Interface", *Java Developers Journel*, Apr. 2004, <http:www2.sys-con.com/itsg/virtualcd/java/archives/0802/aultman/index.html>, pp. 1-6.

Arnold, Matthew, et al., "Collecting and Exploiting High-Accuracy Call Graph Profiles in Virtual Machines", *IEEE*, 2005.

Berndl, Marc, et al., "Dynamic Profiling and Trace Cache Generation", *IEEE*, 2003, <http://ieeexplore.ieee.org/stamp/stamp.jsp?tp=arnumber=1191552>, pp. 1-10.

* cited by examiner

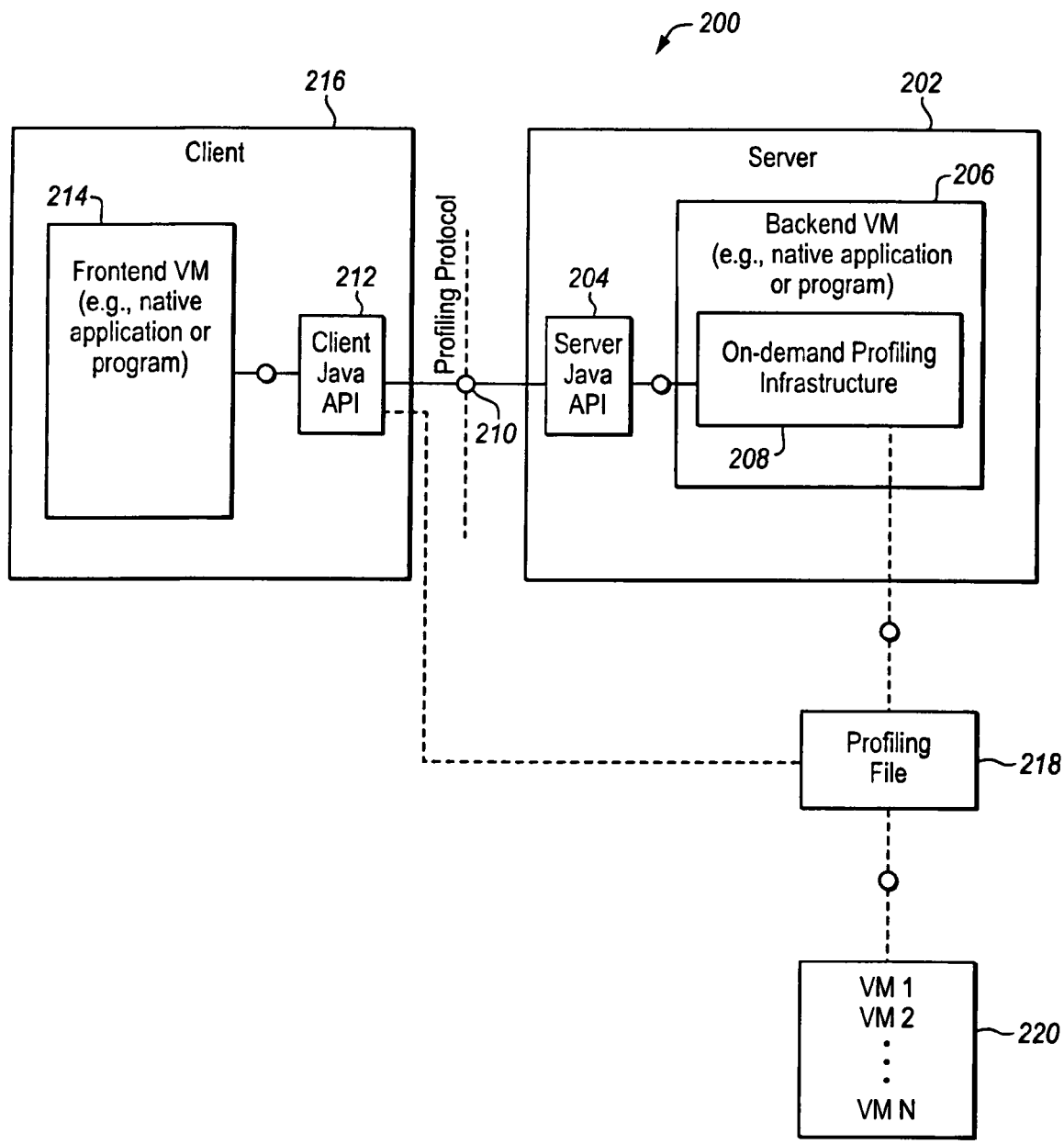

METHOD AND SYSTEM FOR GENERATING A HIERARCHICAL TREE REPRESENTING STACK TRACES

FIELD

Embodiments of the invention relate generally to the field of data processing systems. More particularly, the embodiments of the invention relate to generating a hierarchical tree representing stack traces.

BACKGROUND

A memory on any computing system is a limited resource. No matter how fast computing systems become, they always depend upon a finite amount of memory in which to run their software applications. As a result, software developers should consider this resource when writing and developing software applications.

The Java programming language differs from many traditional programming languages (e.g., C, C++) by the way in which memory is allocated and deallocated. In languages like C and C++, memory is explicitly allocated and deallocated by the application programmer/developer. This can greatly increase the time spent by programmers in tracking down coding defects in regards to deallocating memory. The Java programming language presents several features that appeal to developers, of large-scale distributed systems, such as "write once, run anywhere" portability, portable support for multithreaded programming, support for distributed programming, including remote method invocation, garbage collection, and an appealing object model have encouraged Java use for systems with a size and complexity far beyond small applets. However, the developers of these applications often encounter problems, such as memory leaks, performance and scalability problems, synchronization problems, and programming errors.

Java runtime environments (e.g., Java virtual machine) provide a built-in mechanism for allocating and deallocating memory. In Java, memory is allocated to objects. The Java virtual machine ("VM" or "JVM") automatically handles the amount and allocation of memory upon an object's creation. The Java runtime environment employs a "garbage collector" (GC) to reclaim the memory allocated to an object that is no longer needed. Once the GC determines that the object is no longer accessible (e.g., when there is no longer any references to it stored in any variables, the fields of objects, or the elements of any arrays, etc.), it reclaims the allocated memory. When objects in a Java application are no longer referenced, the heap space the object occupied is to be recycled so that the space becomes available for subsequently-created objects.

Although having garbage collection improves productivity, it is not entirely immune from a class of bugs, called "memory leaks." A memory leak can occur when a program (or in the case of Java, the VM) allocates memory to an object but never (or only partially) deallocates the memory when the object is no longer needed. As a result, a continually increasing block of memory may be allocated to the object, eventually resulting in an "Out Of Memory Error" (OOME). In other words, a memory leak occurs when memory is allocated, but it is never (or only partially) reclaimed. Memory leaks can also occur when a data structure (e.g., hashtable) is used to associated one object with another and even when neither object is required any longer, the association with the data structure remains, preventing the objects from being reclaims until the data structure is reclaimed. Stated differently, when a lifetime of the data structure is longer than that of the objects associated with it, memory leaks are caused.

Memory leaks are of particular concern on Java-based systems (e.g., Java 2 Platform Enterprise Edition (J2EE) platforms) which are to run twenty-four hours a day, seven days a week. In this case, memory leaks, even seemingly insignificant ones, can become a major problem. Even the smallest memory leak in code that runs 24/7 may eventually cause an OOME, which can bring down the VM and its applications or even all VMs running on a particular application server instance. This can cause critical performance problems.

It is generally preferred to profile memory use and debug memory leaks in an application code in the early stages of development to provide an early detection of memory problems long before the production stage. Although garbage collection makes code much safer, because having the developer to explicitly delete objects from memory is prone to human error, garbage collection is not a panacea. For example, if the developer does not manage the references to the Java objects carefully, it can result in a memory leak problem, such as a reference to an object is stored within an instance or class field, this reference may exist throughout the life of the application and, unless desired, is regarded a memory leak.

Within a distributed application server environment having thousand of concurrent users, performance and scalability problems are typical. The causes of problems are various, such as synchronization problems, extensive access to shared resources (e.g., database systems), bad configuration settings, etc. To provide consistency within such a system, locks with various validity scopes (e.g., VM-local, application-server-wide, and system-wide) are used; however, deadlock situations and synchronization problems exist.

Several performance monitoring, profiling, and debugging tools are used to examine software applications to determine resource consumption within the Java runtime environment (JRE). For example, a profiling tool may identify the most frequently executed methods and objects created in an application. A type of software performance and debugging tool is a "tracer." However, such tools are very limited in detecting and exposing system inefficiencies and problems (e.g., memory leaks), while consuming great amounts of system resources by requiring overhead tasks, such as starting and restarting of VMs in special modes. Further, such tools are also limited in providing necessary information about system problems and the limited information that these tools may provide is not useful for applications comprising several thousand objects. This leaves developers with often insurmountable amounts of code to manually evaluate to track down the problem objects/variables, such as the specific class, method calls, etc. For example, conventional profiling tools, like Optimizeit and JProbe, when used, require restarting of VMs and servers, which results in loss of production and system resources, particularly when restarting a productive system. Moreover, the starting of a server and its VMs further adds to the system overhead by increasing memory consumption, which also harms the normal work of the server and server software. The restarting of the server adds overhead in regards to the Central Processing Unit (CPU), as the server would have to start up from scratch.

FIG. 1A illustrates a conventional profiling tool. Client 102 is in communication with server 108. Client 102 includes a VM 102. Server 108 includes a VM 112, which includes Java Virtual Machine Profiling Interface (JVMPI)-based interface 116 and implementation 114. Server 108 further includes a native/default profiling agent (having an agent library) 110 which is plugged into the VM 112 at start-up. Since JVMPI is a native/default-interface, the agent 110 is also written in native code. An agent 110 refers to a software entity, which is used to gather profiling information native VM interfaces (e.g., JVMPI). JVMPI-based implementation 114 suffers from high, memory footprints and, like conventional tools JProbe and Wily Introscope, requires a VM restart. However, conventional profiling tools (e.g., also those using Java Virtual Machine Tool Interface (JVMTI)) cannot be used in productive systems without disturbing user sessions. Further, they cannot be used in large application server environments as they cause high memory consumption. Referring back to FIG. 1A, for example, to start profiling traces, the VM 112 is to be restarted in special way, such as by having the agent 110 loaded at VM-startup, which can cause negative impact on performance and memory consumption. There are merely some of the limitations of conventional profiling solutions. Similarly, conventional monitoring tools and debugging tools (e.g., using Java Virtual Machine Debugging Interface (JVMDI)) also suffer from these and additional limitations.

FIG. 1B illustrates a hash table 150 having stack traces. While performing profiling of Java applications at a virtual machine, stack traces or stack trace elements (elements) 152-168 associated with the current thread are detected and saved in a hash table 150 in a VM. Since many of these stack trace elements 152-168 are repeatedly encountered, several of these elements 152-158 are repeatedly inserted into the hash table 150 which consumes a great deal of memory. Since the hash table 150 is a table-like structure that is used to record every single instance of a stack trace 152-158 that is encountered (and since most stack traces are repeatedly encountered), it consumes a great deal of memory. For example, the main stack trace element 152 ("H"), in the illustrated example, is encountered seven times and is recorded seven times. Similarly, stack trace element 154 ("A") is encountered and is recorded each of the four times it is encountered. This problem extends even to external profiling, which also has to hold these stack traces in a hash table. Furthermore, each time a VM or a profiling tool at the VM needs to look for a profiling even with a stack trace 152-158, it needs to look at each of the stack traces 152-158 where that particular profiling event might be recorded because even if the event is common within various stack traces 152-158, it is recorded in the hash table 150 each time it is encountered, which consumes an even greater amount of memory and significantly contributes to inefficient profiling. Since most stack trace columns 170-182 are different only at their top as indicated by stack trace elements 154-158, 160-168 near the top of stack (TOS) 170, there is no need to repeat common stack traces, such as stack trace H 152; nevertheless, as illustrated, the hash tree 150 stores such stack traces repeatedly, consuming valuable memory space and contributing to profiling inefficiency.

SUMMARY

A system and method are provided to generate a hierarchical tree representing stack traces. In one embodiment, stack trace elements in a plurality of stack traces relating to profiling of an application executing at a first virtual machine are identified, the stack trace elements relating to profiling events being detected during the profiling of the, application. The identified stack trace elements are sorted as one of parent elements; parent/child elements, or child elements based on a number of times a stack trace element has appeared in the plurality of stack traces and its relationship with other elements in the plurality of stack traces. A tree having nodes to represent the stack trace elements is created such that that the child elements branch from the parent/child elements or the parent elements, and the parent/child elements branch from the parent elements.

The above attributes may be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 2 illustrates an embodiment of a server having an embodiment of an on-demand profiling infrastructure.

DETAILED DESCRIPTION

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

Java applications can vary in both size and complexity. In addition, certain large Java application (e.g., ~10,000 classes and ~1,000,000 methods with ~100,000,000 method calls) may run 24/7 ("long living" applications). Within a long living application, major problems (e.g., memory leaks) are expected to occur in terms of both stability and performance. For example, a single long GC living object that increases in size by 1 byte between each GC cycle will eventually cause the application and VM to crash due to an OOME. Although such a crash may take a long time (e.g., 1 bytes per GC cycle * millions of free bytes of memory), it will inevitably occur. Furthermore, when dealing with such long applications and productive systems, mere use of commercial and non-commercial conventional profiling tools and debugging tools having JVMPI and JVMTI profiling interfaces and JVMDI debugging interface, respectively, are not suitable and cannot provide the necessary profiling, debugging, and monitoring information. Even when dealing with suitable systems, such conventional tools cause high memory footprints and are not effective without having to restart the VM and are known to disturb user sessions inherent to the VM.

Figure 1A:
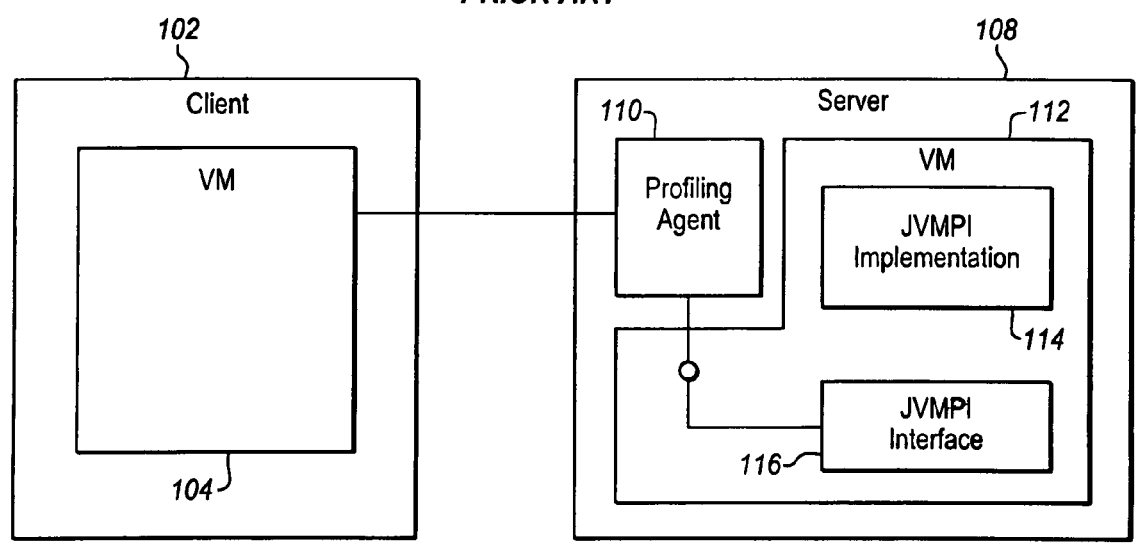
FIG. 1A illustrates a conventional profiling tool.

In one embodiment, a vendor-specific proprietary interface and implementation are provided, as described throughout this document (e.g., see FIG. 1). This implementation can be made an integral part of a VM (e.g., JVM, SAP JVM) and allow for on-demand examining of system problems, including in productive systems, without restarting the underlying VM. These system problems can range anywhere from memory leaks to performance, scalability and synchronization problems. In one embodiment, "on-demand" refers to examining (e.g., profiling, tracing, debugging, and/or monitoring) system problems in runtime, such as without the need for restarting the underlying VM.

FIG. 2 illustrates an embodiment of a server 202 having an embodiment of an on-demand profiling infrastructure 208. Sever 202 comprises a backend VM 206 (e.g., JVM, SAP JVM) having an embodiment of an on-demand profiling framework or infrastructure (profiling infrastructure) 208. Profiling infrastructure 208 is shown in communication with a server Java application programming interface (API) 204. In one embodiment, profiling infrastructure 208 is implemented as an intrinsic and direct part of the underlying VM 206 and is embedded within the backend VM 206, rather than relying on native profiling interfaces, such as JVMTI and JVMPI, and agent, for implementation. Since the profiling infrastructure 208 is, an intrinsic part of the backend VM 206, no additional memory overhead is needed. Java API 204 allows for starting and stopping of the profiling backend VM 206. In one embodiment, backend VM 206 (e.g., Java VM) resides at server 202 (e.g., J2EE server).

In one embodiment, profiling is performed using profiling infrastructure 208 that resides at backend VM 206 that is being profiled. Profiling infrastructure 208 includes a number of components (as described in FIG. 3) to perform trace profiling. In one embodiment, using profiling infrastructure 208, no default profiling agent or default implementations and instances (e.g., JVMPI, JVMTI) are needed or employed. Without having the default agent employed, a direct communication is established between backend VM 206 and frontend VM 214 via server Java API 204 and client Java API 212 and profiling protocol 210. Any number of VMs may be used as backend or frontend VMs. Furthermore, when performing profiling trace in an offline profiling mode, an external profiling file 218 is used to store profiling trace data. Starting and stopping of profiling trace maybe performed in a number of ways, such as using a Graphical User Interface (GUI)-based monitoring tool 220. The profiling data is written using various components of profiling infrastructure 208 and displayed to the user using any number of display devices. These display devices may include GUI-based display devices. In one embodiment, using profiling infrastructure 208, on-demand profiling is performed which refers to performing the profiling without restarting the underlying VM 206. Stated differently, the profiling is performed in runtime without any interruptions or restarting of the underlying VM 206.

Profiling infrastructure 208 can be used for starting profiling traces for certain users or applications, such as using profiling annotations. Profiling annotations refer to a concept of tagging threads with certain semantic information from an application server environment. Here, Java API 204 is provided which allows for annotating a Java thread with one or more of the following information: user name, application name, request identifier, and session identifier. If profiling traces are started, a thread filter for such information is provided and thus, a profiling trace can be started only a certain user or application. A Java API is also provided on the client-side, such as client Java API 212, that communication with server Java API 204 via a profiling protocol 210. Client 216 includes frontend VM 214, which includes any arbitrary VM that represents a native application that speaks (e.g., in case of online profiling) the profiling protocol 210 and/or knows (e.g., in case of offline profiling) the profiling file format of profiling file 218. Backend VM 206 is the one that is being profiled.

It is to be noted that the VMs 206, 214 may not be VMs and instead be any program or application (e.g., a native application or program) that is compatible with the components of and related to the profiling infrastructure 208. For example, the frontend VM 214 is illustrated here merely as an example for brevity and clarity. It is, however, contemplated that a frontend VM 214 or any VM for that matter is not necessary for embodiments of the present invention. For example, in one embodiment, instead of employing a VM 214, any program or application that is compatible with the mechanisms and components described herein is acceptable and functional and can be employed and implemented. Stated differently, for example, any program that can read and speak the described components (e.g., components of profiling infrastructure 208), protocols (e.g., socket communication protocol), APIs (e.g., server- and client-side APIs 204, 212), parameters, profiling files 218, etc., is compatible and can be used instead of a VM, such as the frontend VM 214. This is applicable throughout this document wherever there is mention of a VM 206, 214.

The illustrated mechanism 200 provides both an online mechanism for (interactive) profiling and an offline mechanism for (non-interactive) profiling. When starting profiling the backend VM 206, any profiling parameters including the desired mode, e.g., an online or offline mode, are specified. If started in the online mode, the profiling backend VM 206 opens a port and waits for a connection. The profiling frontend VM 214 attach to this connection via the profiling protocol 210 and Java APIs 204, 212. The starting, running, and stopping of profiling and tracing is then performed. In one embodiment, online profiling is performed via internal components, such as Java APIs 204, 212, or external components, such as a monitoring tool (e.g., Java VM monitor) 220. Online profiling may also be performed using a command line, such as java -agentlib:jdwp,transport=dt_socket,address=8000, suspend=n or bin\java-monjdwp:transport=dt_socket,address=8000,server=y. For the offline mode, profiling files 218 are used to store profiling data and a special interface is provided to couple the backend VM 206 with the frontend VM 214 via client Java API 212 to allow for starting and stopping of traces. In some cases, server Java API 204 can also be used to perform offline profiling. Offline profiling may also be performed using monitoring tool 220 and/or using a command line, such as java -XX:+Profiling -XX:+ProfilingAllocationTrace.

When the profiling mechanism 200 is started in the offline or non-interactive mode, the profiling information is stored in an external medium 218 (e.g., file system) and can be analyzed after the profiling run. This way, the profiling information may then be used for port-mortem analysis; however, traces can still be started and stopped in an interactive manner. In contrast, the online or interactive mode allows for analyzing the profiling information online. For example, if a class statistic trace has been enabled and a garbage collection happens, the profiling information can be directly accessible through a stream-based interface.

Furthermore, to have no performance degradation in case of running in a non-profiling mode (e.g., when no profiling is being performed), VM 206 may maintain a global flag indicating whether profiling is enabled or not. The flag may be requested each time any profiling data is written. For example, a profiling trace for garbage collection events may be implemented in the following way: when a garbage collection is performed, the global profiling flag is checked. If profiling is enabled, the flag is checked to indicate whether garbage collection events are to be profiled. This can also be done via some VM global flags. If the garbage collection trace is enabled, the backend VM 206 may be called to collect the desired data.

Figure 3:
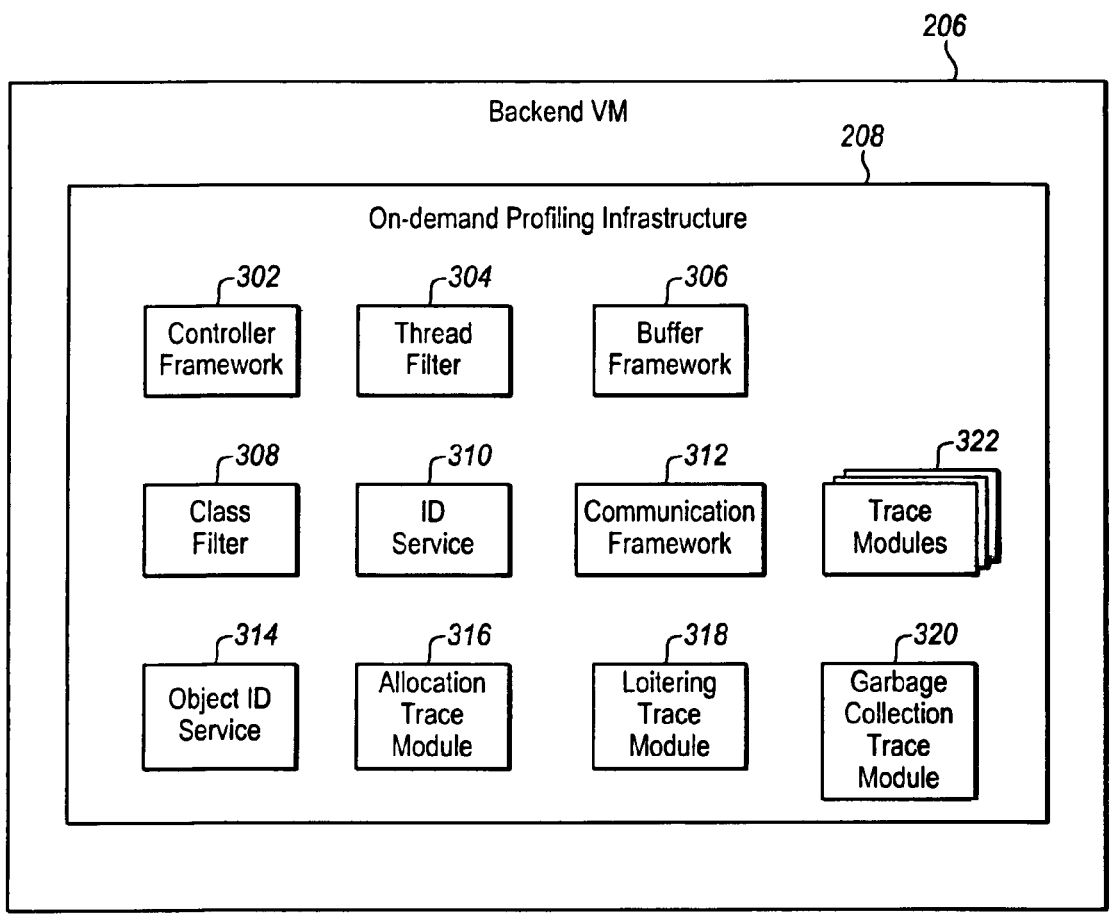
FIG. 3 illustrates an embodiment of a backend VM having an embodiment of an on-demand profiling infrastructure.

FIG. 3 illustrates an embodiment of a backend VM 206 having an embodiment of an on-demand profiling infrastructure 208. In one embodiment, profiling infrastructure 208 contains controller framework 302, thread filter 304, buffer framework 306; class filter 308, identification service 310, communication framework 312, object identification service 314, allocation trace module 316, loitering trace module 318, garbage collection trace module 320, and other trace modules 322 to perform other traces.

In one embodiment, profiling controller framework 302 is used for starting and stopping profiling runs and traces. Controller framework 302 allows the user to specify profiling options or settings that the user would want to enable. These profiling settings to be applied are divided into distinct areas, such as functional profiling settings and filter settings. The functional profiling settings determine the area to be profiled (e.g., allocation trace, reference trace, etc.), while the filter settings define the validity scope (e.g., user, session, thread, VM, etc.) of the functional profiling settings. For example, an allocation trace can be started for a specified user. Java API and graphical user interface (GUI) are provided in communication with profiling controller framework 302. GUI is used to enable the user to directly specify the desired profiling settings without any system-guidance. Additionally, a wizard-similar interface is provided. GUI also allows for an expert mode and for a wizard-guided mode. Controller framework 302 may include a profiling evaluation module for analyzing a performed profiling run. For example, the Java API can be used for getting the complete low-level profiling information gathered within a corresponding profiling run as well as for getting condensed, problem-oriented profiling information. The condensed profiling information may be used to directly pinpoint various problematic areas. For example, if the user has performed performance analysis using a time-based sampling approach, the Java API may enable a client to directly receive information about the time-consuming methods. The user may view this information via GUI at a display device at the client.

Controller framework 302 is used for starting and stopping profiling runs and traces, which includes starting and stopping various profiling options (further described later). For each profiling run the user is free to determine the set of traces to be started. For example, the user may start an allocation trace using the allocation trace module 316 together with a class statistic trace. A user-defined name may be assigned to each non-interactive profiling run and used later on to evaluate the gathered profiling information. Considering interactive profiling runs, the user is able to evaluate the profiling information online and therefore, the profiling information may be available through a stream-based interface.

Furthermore, controller framework 302 may be independent of the surrounding application server environment. Stated differently, controller framework 302 refers to the underlying VM 206 currently executing a profiling request (e.g., starting an allocation trace). The corresponding application server infrastructure may be responsible for starting and stopping the desired trace on other VMs. For example, if an allocation trace is started for a certain user session at VM 208, the application server infrastructure accounts for starting the allocation trace in the VMs executing requests for the user session. Controller framework 302 enables the application server infrastructure to specify thread filters 304. A thread filter 304 may contain the following information: client, user, session identifier, request identifier, application name, and component name. On the one hand, controller framework 302 may provide a facility to tag these pieces of information to a thread. On the other hand, if a certain profiling run is to be started, a thread filter 304 is provided. Hence, for example, a trace may be stared only for a certain user. Accordingly, the application server is responsible for setting the current thread state (e.g., client, user, session identifier, etc.). In one embodiment, an application server includes a J2EE server.

In one embodiment, the profiling options include functions/cases, such as memory debugging (e.g., memory leak detection), performance analysis, synchronization monitoring, and application debugging (e.g., detecting called methods). These profiling functions further include a number of sub-functions, such as heap dump, coupling of debugging and profiling infrastructure, time-based sampling, memory-based sampling, method statistic, allocation trace, silent allocation trace, allocation statistic trace, loitering trace, garbage collection trace, garbage collection statistic, class statistic trace, permanent generation statistic trace, local garbage collection trace, shared garbage collection statistic, other traces, such as reference trace, object death trace, object movement trace, shared closure trace, global reference trace, method trace, time method trace, input/output (I/O) trace, monitor trace, shared lock trace, method count trace, execution line trace, scheduler trace, and exception trace.

Solving a memory leak problem may include a couple of processes, such as identifying the Java classes or objects caused the memory leak, and determining where in the infrastructure or application code the leak occurred. Many of the sub functions can be used to solve memory leak problems. Class statistic trace functionality is provided to help identify the Java classes that cause memory leaks. Class statistic trace includes getting an overview of all living classes within particular VM, including class name, class loader description, the number of object instances, and the accumulated net and gross size of all object instances. The information may be traced after each full local garbage collection. Reference trace includes detecting the objects holding references to leaking objects. It also provides the complete reference chain to a specific object instance. This information may also be available after one full local garbage collection.

If the class statistic trace reveals that specific objects are created over and over again, using the allocation trace module

316, the allocation trace may be enabled to check for the exact allocation place. Using the allocation trace module 316, the allocation trace enables the user to specify a class filter 308. Silent allocation trace is a derivate of allocation trace. When an allocation trace is started, each object, which is allocated and adheres to a user-defined class filter 308, is assigned to an object identifier. Although the allocation trace enables the user to get informed about object allocations, the user may not get the information when the corresponding object dies. In that case, object death trace allows the user to check for those objects are garbage collected and no longer alive. Object movement trace makes allows the checking of why certain objects are kept alive, while the allocation trace allows for getting information when certain objects are created.

Shared closure trace provides for getting object information each time shared closures are created, deleted, copied or mapped. Global references may be used across multiple invocations of a Java Native, Interface (JNI) method and also across multiple threads. A global reference remains valid until it is freed by the programmer and ensures that the referenced object is not garbage collected. For relatively complex scenarios, a dump of the current Java heap is performed. The heap dump function allows for getting a dump of the current, overall object state.

In some cases, memory leaks occur due to the fact that a failed clean-up operation. For example, considering a cache based on shared closures, at regular intervals, the cache might be cleared. If the clean-up operation were interrupted at the end of the operation (e.g., due to a VM abort exception), most cache entries would probably be deleted; however, some entries might still exist. Thus, a memory leak may be resulted if the cache were not able to remove any of the existing entries. The detection of this kind of memory leak could be difficult, since most object instances of the corresponding class are removed and merely a few exist. Thus, class statistic trace may not be the right choice to detect such a memory leak. One characteristic of this problem is that the memory leak is caused by objects which may not be used any longer. The loitering trace performed via loitering trace module 318 facilitates the detection of objects which are not used for a long time.

Various performance problems may be caused by any number of reasons, such as choosing the wrong algorithm for a problem, repeatedly recalculating the same result, excessive allocating of temporary objects, too many I/O operations or transferring too much memory, etc. Profiling helps improving the performance by determining what is it that is to be optimized. Profiling identifies parts of the overall system for which optimization can have an impact on the overall performance. Optimizing a function which only amounts to a miniscule fraction of the overall runtime may not have noticeable benefits. Profiling also determines how the optimization is to be done. Checking for optimization options of those parts that are identified during the first process. Time-based sampling is used to get an overview of methods, which consume the most CPU resources of the application. Time-based sampling works by dumping a stack trace of the currently active thread at regular intervals. Memory-based sampling works analogously to the time-base sampling; however instead of dumping a stack trace in time intervals ($\Delta t$), stack trace is sampled after an amount of memory ($\Delta M$) is allocated on the Java heap. This way, those methods that allocate the largest number of bytes on the Java heap are identified.

When time-based sampling shows that a method uses a large amount of time, the reason for this resource consumption might be that a call of the method is expensive or the method is called very often. To find out how many times a particular method was called, method statistic trace may be used. Together with time-based sampling, method statistic trace may also allow for calculating the average runtime of a specific method (e.g., the "cumulative time" divided by the method count). Method trace is used to get more detailed information than method statistic. Time method trace can be used to provide very detailed trace information. Time method trace provides for detecting method calls that (for any number of reasons) take a particularly long time. To see, if garbage collection is properly configured or if a particular problem related to garbage collection exists, local GC statistic is used, which includes dumping a statistical entry for each local garbage collection (partial and full) for each garbage collection run. Shared GC statistic is emitted when a local GC detects that a shared GC has happened and has not been dumped yet. The shared GC statistic contains the number and size of the collected shared classes, shared interned strings, and shared classes.

Another source of performance problems is related to I/O. These I/O-related problems include a network connection being operated at its bandwidth maximum, the latency being too high, an external system being overloaded, etc. To check for an I/O problem, I/O trace allows for tracing the timing of each I/O operation. I/O trace can be used in analysis to check for operations, where huge amounts of data were transmitted, the I/O operation took an extraordinary amount of time, or a huge amount of small I/O operations was performed.

Java has an explicit support for multithreading and concurrency at the language level. Although these welcome features, the typical problems with multithreading and concurrency are deadlocks, race conditions, thread starvation, and scalability problems. Synchronization monitoring is provided to detect such problems. For example, synchronization monitoring includes monitor trace that identifies deadlock or scalability problems and gathers information about locks used inside a VM. To find synchronization problems, a thread trying to acquire a lock is identified and once it is identified, the lock is freed by the thread. Shared lock trace is used to identify deadlocks between VMs and scalability problems of a server instance. Shared lock trace provides information about different kinds of shared lock activities, like entering and leaving. Further, for such problems above, scheduler trace is used to know why a thread was scheduled and why it gave up control of the CPU, and for how long the entire VM was waiting on external I/O or just sleeping.

In one embodiment, application debugging is used to provide those the debugging functionalities that are not supported by conventional debugging instances and protocols, such as JVMDI, Java Debug Wire Protocol (JDWP), etc. For example, application debugging covers functionalities, such as call coverage and line coverage. Regarding call coverage, method count trace may deliver a number of calls to a method. Regarding line coverage, execution line trace may deliver information about code lines that were executed. Method call trace is used to find all methods that are called. When the method call trace is enabled, the VM 206 counts method calls and when the method call trace is disabled, the VM 206 dumps the collected information, such as name and signature of a method and the number of times it was called. Execution line trace may be used to find out the lines of code that are not executed. When the execution line trace is triggered, it enables the VM to write out information about the method and code line each time a byte code is interpreted and/or the line number changes. Such information can help the developer find out the lines of code that are not covered particular test cases.

Method trace may be employed to trace or profile the debugging process of an application. For example, the method trace is used to find out what has happened before the program reaches a certain point. Such information may be used to trace back the program flow and find out in which way the program reached that point of code. Exception trace is another functionality that may be employed to trace or profile the debugging process of an application. This information can be used to trace back the reasons for exceptions that followed up and for different execution branches.

In one embodiment, a dedicated Java API and a GUI is provided to allow for starting and stopping of various functionalities and uses (e.g., allocation trace, loitering trace, GC trace, and other traces) and for getting the corresponding profiling and tracing results. To determine and analyze the profiling and tracing results, an expert mode and/or a guided mode are provided. For example, a guided mode may directly pinpoint any problem areas.

Profiling infrastructure 208 is compatible with multiple clients. For example, depending on the surrounding application server infrastructure and whether any clients are handled in a special way, the profiling infrastructure 208 may perform in compliance with several clients, simultaneously, and remain multiple client-compliant. Profiling infrastructure 208 also allows for restricting profiling runs to certain clients, while the surrounding application server environment may assure that the current client information is assigned to the respective thread. Furthermore, profiling infrastructure 208 may be started on-demand, which includes performing profiling infrastructure functionalities (e.g., profiling, tracing, etc.) without restarting the entire application server or even the underlying VM 206. If no profiling option is enabled by a certain user, there is no impact on the response time caused by the profiling infrastructure 208. However, if profiling is enabled, it may depend on the started profiling options and filter settings about how the overall system performance is influenced. For example, if a method trace is started on an application server without any filter settings (e.g., user, classes, etc.), the performance may decrease to an extent. Therefore, the profiling infrastructure 208 as well as the application server infrastructure must provide options to restrict profiling runs. This way, profiling may be enabled for a particular user or session, while users and sessions remain unaffected. In addition, profiling infrastructure 208 provides reasonable and necessary filter settings for various profiling traces.

Class filters 308 are implemented to allow for limiting profiling trace outputs by limiting the process of profiling to, for example, specific traces. For example, if a developer seeks to profile only Java object allocations which refer to java.lang.HashMap instances, then, using class filters 308, a profiling allocation trace with a class filter applying exclusively to java.lang.HashMap instances is started. Thread filters 304 relate to profiling annotations (e.g., specifying annotations), such as when an allocation trace exists. Thread filters 304 may also be used by the user to specify when and/or where a trace is to be triggered and/or used. Buffer framework 306 is used to compress and decompress any type of data or information that is being communicated, stored, etc. Communication framework 312 is used to facilitate communication of any data or information between and within various components, elements, modules, systems, servers, VM, etc. Communication framework 312 is also used to determine and facilitate the storing of data or information, such as storing the data using files or socket connections.

ID service 310 is employed to specify variables, such a class, a name of the class, etc. to assign identification to them. Once class, class names, etc. are assigned an ID (e.g., a number), they are then mapped with each other and with various components and variables via a mapping packet, instead of mapping by names. Using ID service 310, the same can be done with threads and methods. For example, by assigning IDs (instead of names) to threads and methods, when dumping is performed, the IDs of threads and methods are dumped rather than their names. This technique of using IDs (e.g., numbers) instead of using the names is efficient, fast, and saves memory.

For example, an allocation event is considered. ID numbers are mapped to various packet names, such as java.Hashtable is mapped to "2000", the thread (named, "main") is assigned "3", and the user (named, "Hansi") is assigned "7". Stack trace is then commenced using command lines, such as com.sap.test (line 30), com.sap.submethod (line 2003), etc. The even information may then be provided as 2000, 3, etc. It is known that ID number 2000 was mapped to the underlying hashtable, while ID number 3 was mapped to the thread. Using these ID's, names (e.g., main, Hansi, etc.) are not needed and instead, IDs are used, which provides an easier technique for packet name mapping. Similarly, object ID service 314 is used to assign IDs (e.g., numbers) to objects so the IDs can be used to, for example; identify and compare the objects, instead of using object names.

In one embodiment, profiling information and any other relevant data is displayed at a display device via GUI at a client so that a user can access and evaluate the displayed information. The information may also be stored at a database and/or file system for subsequent retrieval and analysis. Although Java components, such as J2EE server, Java VM, Java heap, and Java memory errors, etc., are discussed here for simplicity and brevity, it should be noted, however, that the underlying principles and embodiments of the present invention may be implemented within any type of object-oriented and runtime environments. Moreover, it should be noted that requirements and examples used in this document do not necessarily reflect the real values that a system or program would actually produce. For example, garbage collection may be invoked multiple times while checking the VM heap memory size, so that there are different VM implementations and, according to a relevant VM specification, a given VM implementation might not clean up the memory immediately after it has been requested to do so. Thus, to be sure that a memory cleanup is provoked, the memory size may be checked and the garbage collection may be invoked again, as necessary.

Garbage collection as described here includes a process designed to identify and reclaim blocks of memory that are dispensed by a memory allocator but are no longer "alive" or "live" (e.g., no longer being used, as determined, for example, by not being reachable from any currently referenced objects or entities). Garbage collection can sometimes be handled as a background task by runtime systems rather than as an explicit task by user programs. Garbage collection can also be handled as an inlined task. Garbage collection can be used to reclaim memory in runtime systems, and there are some well-known garbage collection algorithms (e.g., reference counting, mark-sweep, mark-compact, and copying algorithms).

A VM (e.g., VM 206) is an example of a runtime system. A VM refers to an abstract machine that includes an instruction set, a set of registers, a stack, a heap, and a method area, such as a machine or processor. A VM essentially acts as an interface between program code and the actual processor or hardware platform on which the program code is to be executed. The program code includes instructions from the VM instruction set that manipulates the resources of the VM. The VM executes instructions on the processor or hardware platform on which the VM is running, and manipulates the resources of that processor or hardware platform, so as to effect the instructions of the program code. For example, a Java source program can be compiled into program code, such as bytecode. Bytecode can be executed on a VM, such as JVM, running on any processor or platform. The JVM can either interpret the bytecode one instruction at a time, or the bytecode can be further compiled for the real processor or platform using a just-in-time (JIT) compiler.

The illustrated VM 206 includes a JVM (e.g., SAP JVM), which is used as an example; however, other examples of VMs, which can be used in various embodiments, include Advanced Business Application Programming (ABAP) language VMs, Common Language Runtime (CLR) VMs, and the like. ABAP is a programming language for developing applications for SAP systems, such as SAP R/3 system, which is a widely installed business application system developed by SAP AG of Walldorf, Germany. The CLR is a managed code execution environment developed by Microsoft Corp. of Redmond, Wash. For simplicity and brevity, the discussion in this document focuses on virtual machines, and in particular Java virtual machine 104, but it is to be understood that the techniques described herein can also be used with other types of runtime systems.

A runtime system includes a code execution environment that executes instructions or code in user requests and that provides runtime services for that code. Code runtime services may include functionality, such as process, thread, and memory management (e.g., laying out objects in the server memory, sharing objects, managing references to objects, and garbage collecting objects). Enhanced runtime services may include functionality, such as error handling and establishing security and connectivity.

The illustrated server 202 includes a J2EE server/engine/node, which supports Enterprise Java Bean ("EJB") components and EJB containers (at the business layer) and Servlets and Java Server Pages ("JSP") (at the presentation layer). It is understood that processes taught by the discussion above can be practiced within various software environments such as, for example, object-oriented and non-object-oriented programming environments, Java based environments (such as a J2EE environment or environments defined by other releases of the Java standard), other environments (e.g., a .NET environment, a Windows/NT environment each provided by Microsoft Corporation), and the like.

Figure 4:
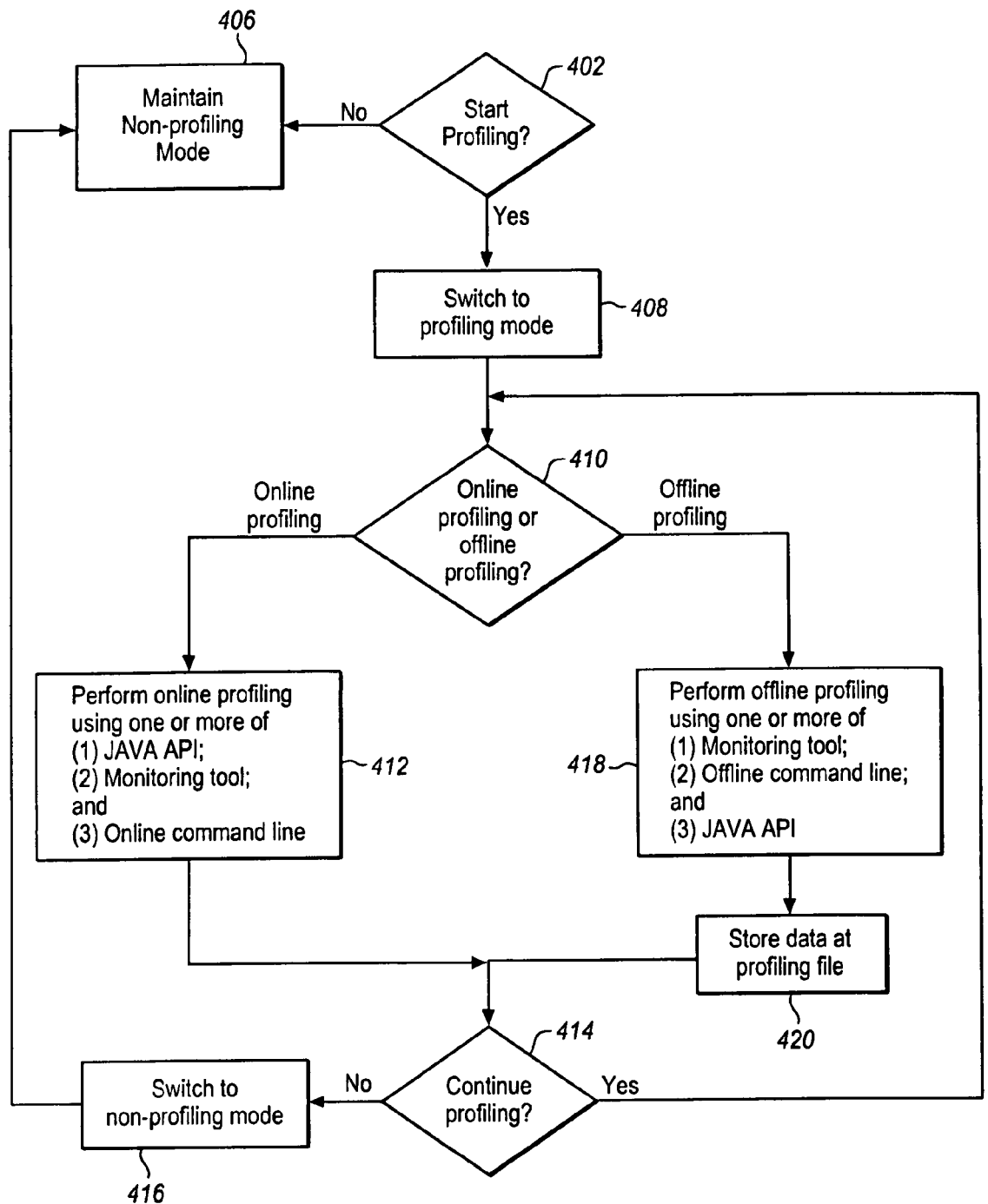
FIG. 4 illustrates an embodiment of a process for profiling using an embodiment of an on-demand profiling infrastructure.

FIG. 4 illustrates an embodiment of a process for profiling using an embodiment of an on-demand profiling infrastructure. At decision block 402, whether profiling need be started is determined. If not, the non-profiling mode is maintained, which saves system resources. If the profiling is to be started, the profiling mechanism is switched to the profiling mode at processing block 408. At decision block 410, a determination is made as to whether online or offline profiling is to be performed. If the profiling is to be performed online, the online profiling mode is triggered for, for example, interactive profiling at processing block 412.

Online profiling is started via Java APIs (e.g., server and client Java APIs), using monitoring tools (e.g., Java VM monitor), and/or using command lines. If the profiling is to be performed offline, the offline profiling mode is triggered for, for example, non-interactive profiling. Offline profiling can also be started using monitoring tools, using command lines, and/or via Java APIs as described above. At processing block 420, any profiling data obtained from offline profiling is stored at an external source, such as a profiling file. The data at the profiling file may be stored in zipped format. At decision block 414, whether the process of profiling be continued is determined. If yes, the profiling continues with decision block 410. If not, the profiling status is switched to the non-profiling mode at processing block 416. This non-profiling mode is maintained at processing block 406.

Figure 5A:
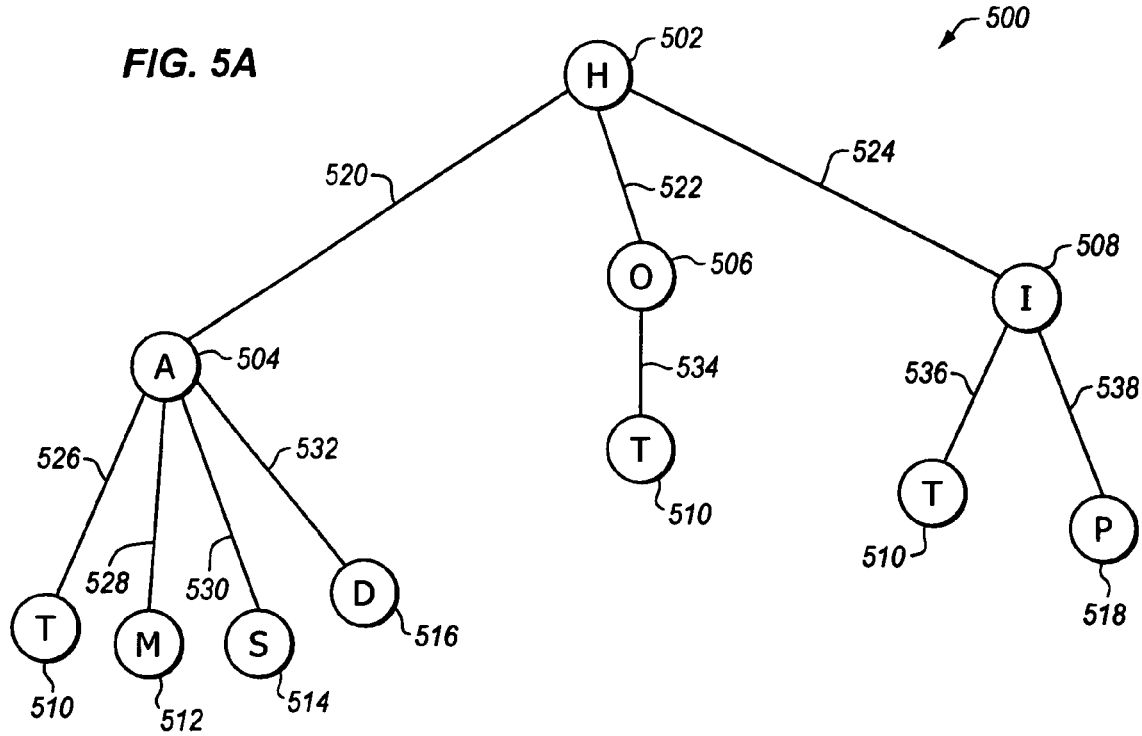
FIG. 5A illustrates an embodiment of a tree having nodes to reference stack trace profiling information.

FIG. 5A illustrates an embodiment of a tree 500 having nodes 502-518 to reference stack trace profiling information. In one embodiment, tree 500 is generated to provide a tree-like hierarchical structure (e.g., ternary search tree (TST)) to provide a memory-saving and efficient structure for listing stack traces. For brevity and clarity, tree 500 and its contents are provided merely as an example and it is contemplated that a stack trace-based tree would contain real stack traces and stack trace-related information and elements (rather than the alphabets (e.g., H, A, S, etc.) shown here) and that the tree is like to be far more complex having a number of branches and nodes. Although the terms,. "stack trace" and "stack trace element" or "element" are used interchangeably throughout this document, it is contemplated that a single stack trace element, such stack trace element A 504 or stack trace element S 514, could represent a stack trace and, on the other hand, an entire set of stack traces, such as stack trace elements HAT 502, 504, 510, could represent a stack trace. Furthermore, a set of stack trace elements, such as stack trace elements HAT 502, 504, 510, may represent a thread in the VM where the profiling is or has been conducted. Furthermore, the term "node" is also used to define the different locations, such as nodes 502-518, in the tree 500 where various stack traces or stack trace element and other relevant information reside.

Figure 1B:
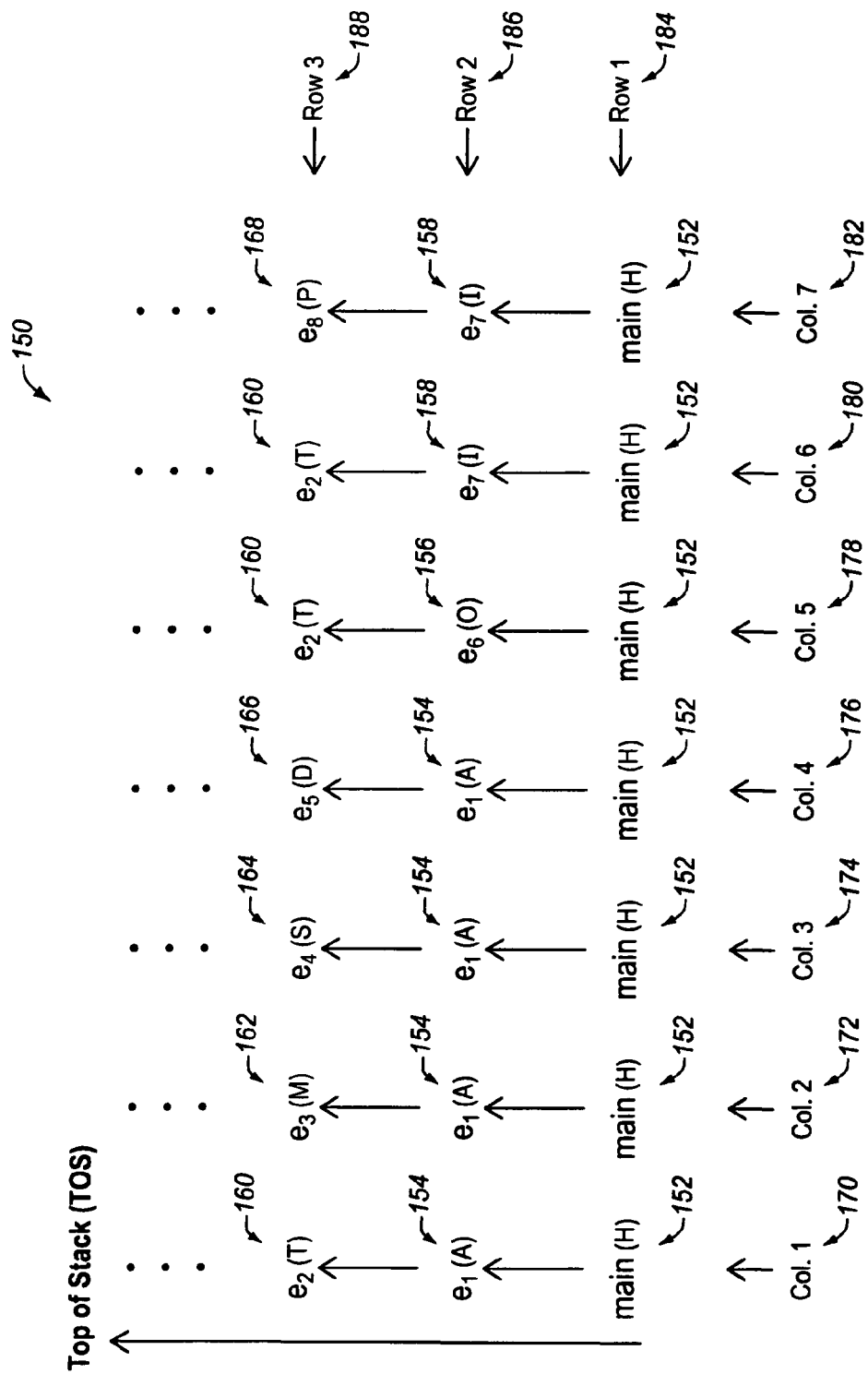
FIG. 1B illustrates a hash table having stack traces.

Since most stack traces are different near the top of a stack trace column (as shown in FIG. 1B), tree 500 is generated and used to minimize the number of times various stack traces or elements 502-518 are stored. For example, as illustrated, common stack trace elements, such as stack trace elements H 502, A 504, I 508, and even stack trace element T 510, are plotted and stored in their respective nodes in tree 500, as and when necessary. By reducing the number of nodes 502-518 and the number of times a node 502-518 is stored in tree 500, the memory consumption in the underlying VM is greatly reduced. For example, when tree 500 is compared with the hash table 150 of FIG. 1B, it can be observed that for the same number of stack trace elements, the hash table 150 has twenty-one (21) entries, while the tree 500 has merely eleven (11) nodes 502-518, which greatly reduces memory consumption in the VM.

Furthermore, when a profiling tool is used at the VM to perform profiling sessions, it can use the same sharing of stack trace elements at nodes 502-518 without having to monitor the entire tree 500 or going all the way up to the commonest node H 502. For example, when a new stack trace element, such as stack trace element M is added via node 512, there remains no need for the profiling tool to re-evaluate the two preceding common stack trace elements H, A at nodes 502, 504, but rather simply look at the most recently added stack trace element M at node 512, because the two common stack trace elements H, A at nodes 502, 504 are not re-plotted or re-stored. In this example, the newly encountered stack trace element M is added via node 512 and branched out 528 of the last stack trace element A at node 504. Further memory and profiling performance improvement is archived by having the most recent stack trace elements at nodes 510, 512, 514, 516, 518 of each thread stored in tree 500 in addition to the corresponding stack trace elements at nodes 504, 506, 508. Using this technique, the underlying VM can determine efficiently which stack traces remained since the last time a stack trace was requested for the thread and thus, tree 500 is to be searched starting from the nodes of the last or most recent stack trace elements at nodes 510, 512, 514, 516, 518. This is especially useful when stack traces are requested very often (e.g., when every allocation of an object is to be traced in a profiling session). Hence, both the memory consumption and performance at a VM and therefore, CPU efficiency are improved by having stack traces at nodes 502-518 represented in a tree-like hierarchical structure 500.

In one embodiment, stack trace elements at nodes 502-518 are detected and then sorted as parent stack trace elements at parent nodes 502, parent/child stack trace elements at parent/child nodes 504, 506, 508, and child stack trace elements at child nodes 510, 512, 514, 516, 518. For example, since element H at node 502 common to every other element at nodes 504-518, it is provided once and as a parent to other elements at nodes 504-518 by having the parent/child elements at parent/child nodes 504-508 branch out of parent element H at parent node 502 and child elements at child nodes 510-518 further branching out of the parent/child elements at parent/child nodes 504-508. Now, stack trace elements at nodes 504-508 are regarded and sorted as parent/child elements at parent/child nodes 504-508 because they are child elements to the parent element H at parent node 502, but they are parent elements to the child elements at child nodes 510-518. As illustrated, stack trace child elements at child nodes 510-518 do not have any elements branching out of them. However, if a new stack trace element was to be added to a child element, the child element at child node would then become a parent/child element at parent/child node. For example, referring to FIG. 5B, if a new element E via a new node 520 is to be added to the child element T at child node 510, it would turn the child element T at child node 510 into a parent/child element at parent/child node and the new element E at node 520 is then be classified as the child element E linked to the element T at node 510 via branch 540 and node 520. The word representing the stack trace link or string or the like then looks like HATE at nodes 502, 504, 510, and 520 linked by branches 520, 526, 540. Branches 520-538 are used to link nodes 502-518.

Now referring back to FIG. 5A, tree 500 may include a TST that provides an implementation of an N-ary search tree for large values of N representing stack trace elements 502-518 (here, N being the size of the alphabet). For example, for brevity, simplicity and clarity, tree 500 encodes the following words as stack trace elements and strings of stack trace elements: HAT 502, 504, 510, HAM 502, 504, 512, HAS 502, 504, 514, HAD 502, 504, 516, HOT 502, 506, 510, HIT 502, 508, 510, and HIP 502, 508, 518. In one embodiment, each node 502-518 having stack trace elements and relevant information are linked together via a number of branches 520-538. Nodes 502-518 may further contain characters and identifications of various sorts (e.g., alphabet, number, alpha-numeric, etc.) corresponding to each line in each method of a stack trace that is relevant to a profiling event detected from profiling at the underlying VM. Using this technique, only a small amount of storage or memory is need and consequently, a large amount of storage or memory is prevented from being consumed. Although a node 502-518 may be linked using any number of branches (e.g., node 502 has three branches 520, 522, 524 linking to nodes 504, 506, 508), but not all nodes (e.g., nodes 504, 506, 508) or branches (e.g., branches 520, 522, 524) linking the node (e.g., node 502) may be used for each search.

When searching for a given string of stack trace element corresponding to a method relating to a profiling event, the process starts at the node having the most comment stack trace element, such as in the illustrated embodiment, at top node H 502 and the first character of the string is then compared to that of the node 502. If the character in the string is lower than that of the character of the node 502, another link (e.g., left link 520 to node A 504) is followed and the same process or action is performed at that node 504. If the character in the string is higher than that of the main node 502, another link (e.g., right link 524 to node I 508) is followed and the same process is performed at that node 508. If the character in the string is the same as that of the character of the main node 502, the next or second character of the node is compared and the process continues with the middle link 522 to node O 506. The process continues on with the following nodes in each case, until a match for the last character is found and as such the string is found at tree 500. If no match is found, tree 500 does not contain the string. Using this technique, even for a large N, tree 500 uses only a little memory and is used to store stack traces and other relevant information at nodes 502-518.

Each stack trace encountered is determined using the aforementioned procedure from the start with the most common node 502 to the next until either a match is found or not. A comparison of the tree 500 with the hash table 150 of FIG. 1B indicates that most common stack traces are found in the bottom frames or rows of the hash table 150, such as rows 1 and 2 184, 186 having common elements as H 152, A 154, etc., corresponding to the common elements, such as H 502, A 504, etc., in the tree 500. In one embodiment, a complete stack trace is found in tree 500 and a corresponding identification (ID) is returned, which may have been previously added to each node 502-518. If a complete stack trace is not found, a new node having the stack trace is added to complete the stack trace tree 500. Using this technique, the already known parts of the stack trace are known and thus, the ID(s) of the one or more stack traces that contain the one or more shared frames is/are removed. Therefore, when a mapping between the stack trace and its ID is performed, merely the new nodes (corresponding to the new or top-level frames of a hash table) are dumped and the common nodes (corresponding to the common or low-level frames of a hash table) are referred to by the ID of the stack trace that contains them too. This technique can be later used by an application that examines the data, such as in the matter that instead of storing an entire stack trace, it can store merely the new nodes referencing the stack trace and therefore, further saving the memory and storage.

Since for a given thread, how much of a stack trace has changed since the last time it was received can be detected (e.g., by noticing method returns), another optimization can be done to reduce CPU time. For example, for every thread, the last stack trace 510-518 is stored for every frame in a hash table for which the node 510-518 in the tree is matched. Thus, if a new stack trace is to be received, the newest node 510-518 for a corresponding thread is detected, since the newest nodes 510-518 (or the higher frame rows of a hash table) are the most different from each other. This means the search for the matching frame can be started in the tree 500 directly at the node corresponding to the last matching frame, which saves a great deal of CPU time. For example, if a profiling tool performing profiling at a VM, needs to search for the newest stack trace or stack trace element, it merely needs to check the most recent nodes 510-518, instead of going through the entire tree 500 and there is no need to go up to the main node 502. This saves a great amount of CPU time.

For example, in comparison with a hash table (such as the one illustrated in FIG. 1B), the search starts at the main row 1 184 and continues up to the last row, such as row 3 188, to encounter the newest stack trace, such as stack trace element T 160, following the TOS 170. In one embodiment, using the tree 500, when a VM or a profiling tool at the VM or the like needs to go directly to a recently added stack trace element, such as stack trace element T 510, it needs to go directly to the node 510 matching that stack trace element and does not have to go up to the main node H 502 which is already known and thus, there remains no need to go up to it. Hence, this technique saves CPU time (by limiting the amount of search) as well as memory space (by limiting the number of nodes, such as 11 nodes for tree 500 as opposed to 21 nodes for the hash table 150 of FIG. 1B). Furthermore, any nodes of nodes 502-518 of tree 500 that are not being used or the information provided by these nodes is longer necessary, such nodes may be deleted to further save memory and CPU time and provide room for newer nodes to be linked.

In one embodiment, the commonality of stack trace elements before they are placed at various nodes 502-518 is determined by, for example, detecting the number of time a stack trace element has occurred in various stack traces. For example, a parent node 502 includes a parent stack trace element that is more common than a parent/child element at a parent/child node 504-508, which is more common than a child stack trace element at a child node 510-518. In other words, for example, a parent stack trace element (e.g., stack trace element H at node 502) appears in or is associated with or is common to a greater number of stack traces (in this example, element H at node 502 is associated with or common to all stack traces) than a parent/child stack trace element (e.g., stack trace element A at node 504) which appears in or is associated with or is common to a greater number of stack traces (in this example, element A at node 502 is associated with stack traces having elements T, M, S, and D at nodes 510, 512, 514, and 516, respectively) than a child stack trace element (e.g., stack trace element T at node 510). Stated differently, parent stack trace elements are likely to be common to more stack traces than parent/child stack trace elements that are common to more stack traces than child stack trace elements but are common to fewer stack traces than parent stack trace elements. Throughout this document, for brevity and simplicity, the number of occurrences of stack traces elements at nodes 502-518 in various stack traces is references how common a stack trace element at nodes 502-518 is to various stack traces and thus, the higher the number of occurrences in stack traces the more common the stack trace element compared to other stack trace elements and, conversely, the fewer the number of occurrences in stack traces the less common the stack trace element.

Figure 6A:
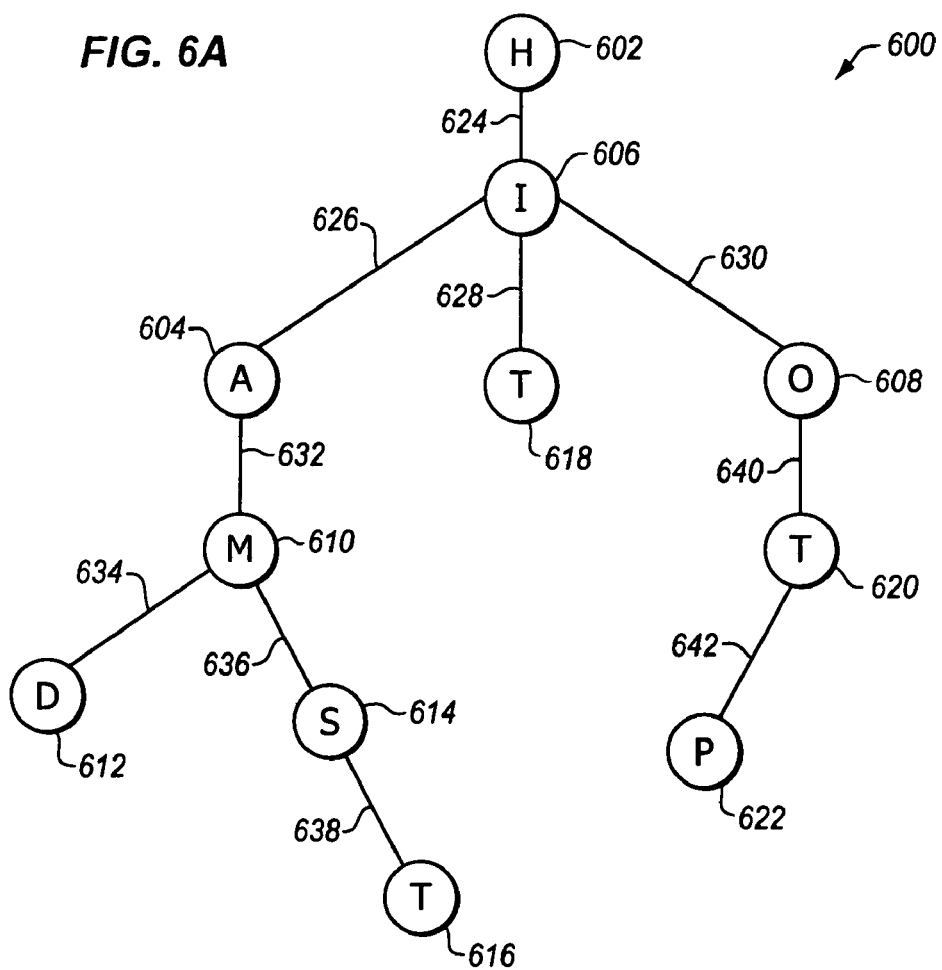
FIG. 6A illustrates an embodiment of a tree having nodes to reference stack trace profiling information.

FIG. 6A illustrates an embodiment of a tree 600 having nodes 602-622 to reference stack trace profiling information. It is to be noted that for brevity, descriptions, properties, and details provided with reference to tree 500 of FIG. 5A, although applicable to tree 600, are not discussed here. The same example stack trace references of HAT, HAM, HAS, HAD, HOT, HIT, HIP are provided in a different format of tree 600, the format of which may be used for implementing tree 500. Here, in one embodiment, once node M 610 is linked node A 604, other nodes 612, 614, 616 are not necessarily linked to branch from node A 604, but rather to other subsequent nodes, such as node D 612 branches from node M 610, node S 614 branches from node M 610, and node T 616 branches from S 614. It is contemplated that these nodes 610-616 may be rearranged, as necessary, such as node T 616 may be linked to branch from node D 612. Nodes H 602, A 604, M 610, D 612, S 614, and T 616 form the example stack trace string codes HAD 602, 604, 612, HAM 602, 604, 610, HAS 602, 604, 614, and HAT 602, 604, 616.

Similarly, nodes O, T, P 608, 620, 622 are also shown to be implemented a bit differently from the way they are illustrated in tree 500. Here, in one embodiment, node P 622 branches from node T 620 which branches from node O 608 branching from the most common node H 602 via the middle node I 606. It is contemplated that node 608 may also branch directly from node H 602. Nodes H 602, O 608, T 620 and P 622 form the example stack trace string codes HOT 602, 608, 620 and HOP 602, 608, 622. In the middle link, node T 618 branches from node I 606 which branches from node H 602 forming the example stack trace string code HIT 602, 606, 618.

Figure 6B:
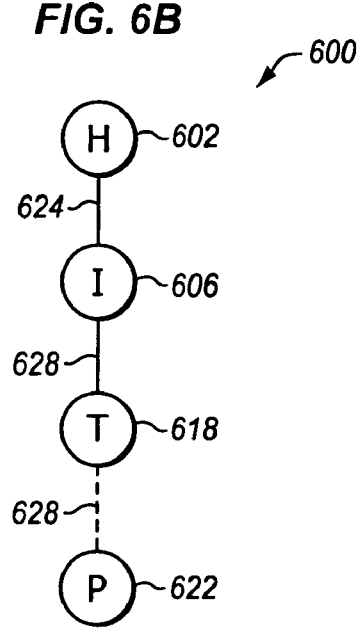
FIG. 6B illustrates an embodiment of node addition and movement within a tree referencing stack trace profiling information.

FIG. 6B illustrates an embodiment of node addition and movement within a tree 600 referencing stack trace profiling information. In one embodiment, node P 622 is linked from node T 618 via branch 644, instead of being linked to node T 620 via branch 642, to form the example stack trace string code HIP 602, 606, 622. In another embodiment, a moving technique is provided to first, link node P 622 to node T 620, but then move node P 622 to be linked to node T 618.

It is contemplated that any references to Java-based components, such as Java application server, Java VMs 206, 214, Java stack traces, etc., are provided as examples and that the mechanism 500 and other embodiments of the present invention can also be used with other non-Java-based environments and components. Furthermore, a backend VM 206 may reside at the same J2EE engine as the tree generation module or at another J2EE engine or at another server. A server and a client may include servers and clients similar to server 202 and client 216, respectively, of FIG. 2.

Figure 7:
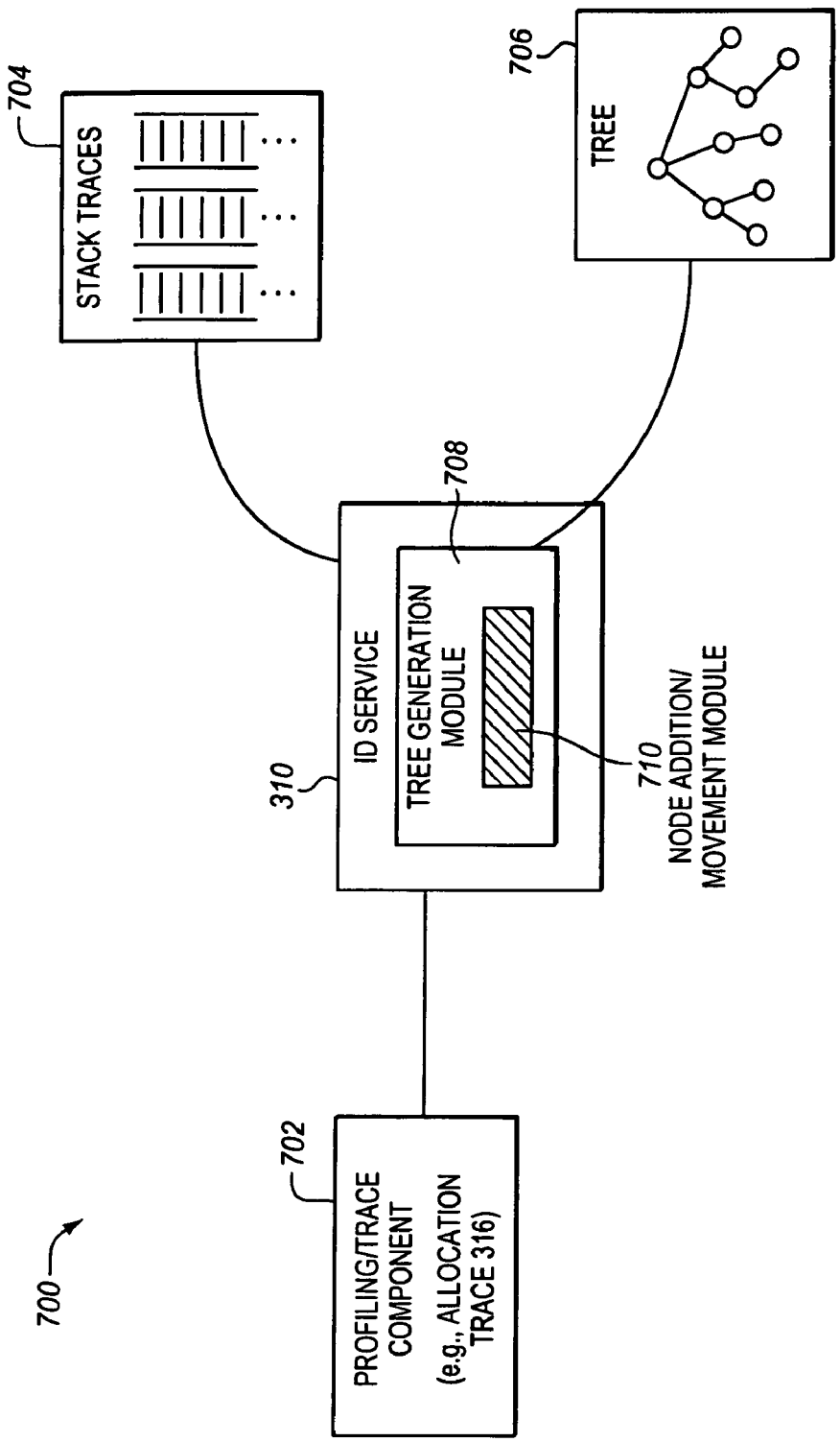
FIG. 7 illustrates a mechanism for generating a tree referencing stack trace profiling information.

FIG. 7 illustrates a mechanism 700 for generating a tree referencing stack trace profiling information. It is to be noted that for brevity, descriptions, properties, and details provided with reference to trees 500 and 600 of FIGS. 5A and 6A, although applicable here, are not discussed here. In one embodiment, ID service 310 is used to provide for a tree-like hierarchical structure 706 (such as trees 500 and 600 of FIGS. 5A and 6A, respectively). In the illustrated embodiment, profiling at a VM is provided via a profiling/trace component 702, (e.g., allocation trace 316) to perform profiling at the underlying VM (e.g., VM 206). The profiling/trace component 702 is in communication with ID service 310, which provide identification of stack traces 704 (e.g., via the previously assigned IDs) detected during profiling to be converted into being represented by a tree 706 having nodes to provide the relevant stack trace information.

Figure 5B:
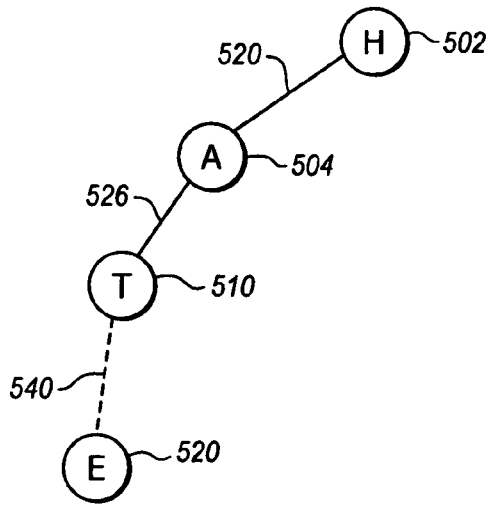
FIG. 5B illustrates an embodiment of node addition within a tree referencing stack trace profiling information

In one embodiment, ID service 310 identifies each stack trace 704 at the underlying VM and works with tree generation module 708 to generate the tree 706. Stack traces 704 are generated during a profiling session of an application (e.g., Java application) at a VM. A profiling session may include various traces, etc., that are performed on the application running at the VM as described elsewhere in this document. Tree 706 contains nodes to provide the stack trace information being identified and gathered by the ID service 310 and plugged into the nodes by the tree generation module 708. The illustrated embodiment of the tree generation module 708 further contains node addition/movement module 710 to provide the addition and movement of nodes as illustrated in FIGS. 5B and 6B. In one embodiment, stack traces 704 are deleted as they come to being provided by tree 706. Similarly, any nodes of tree 706 that are not being used or are the information provided by these nodes is longer necessary, such nodes may be deleted to further save memory and CPU time and provide room for newer nodes to be linked.

Figure 8:
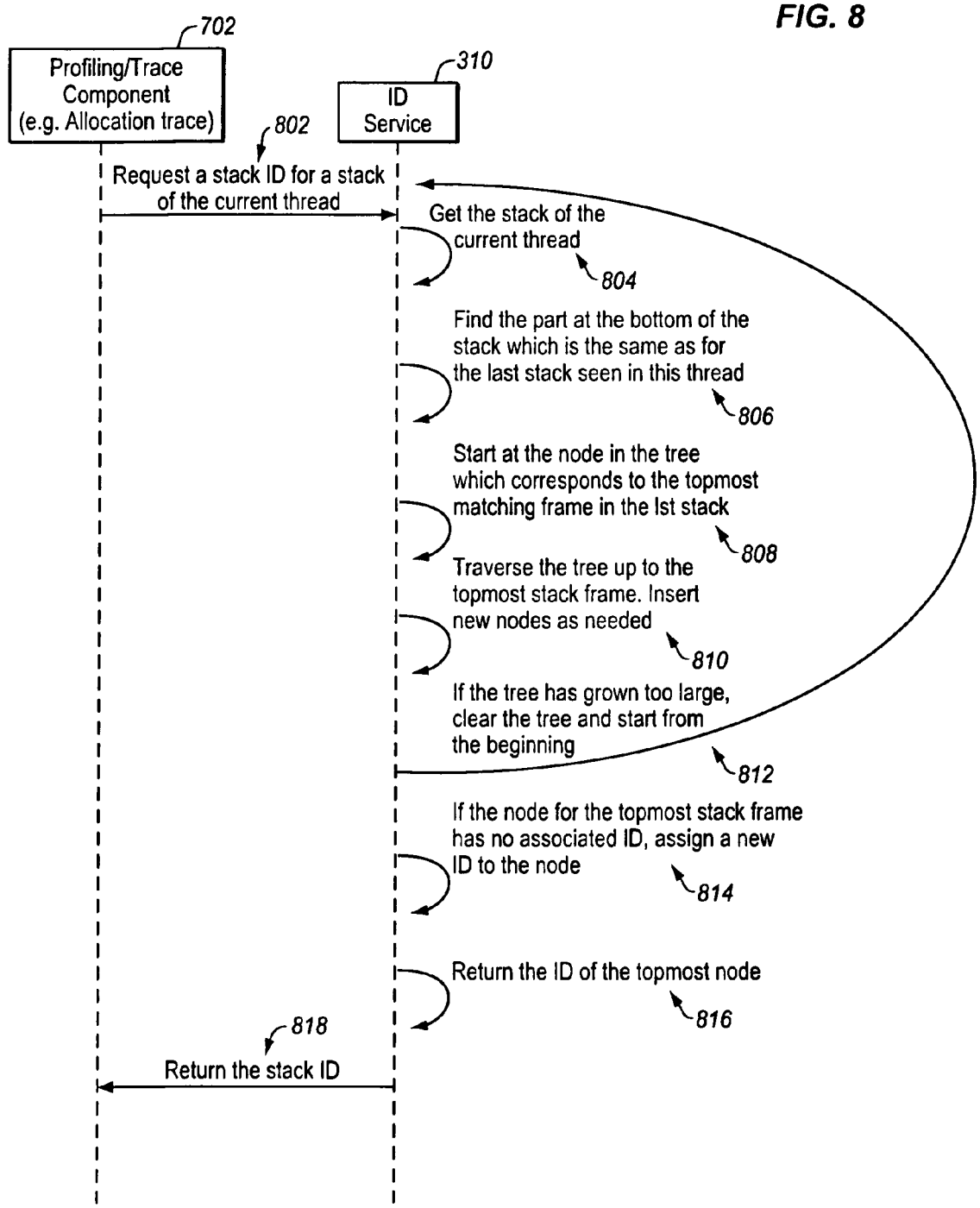
FIG. 8 illustrates an embodiment of a transaction sequence for generating a tree having nodes to reference stack trace information.

FIG. 8 illustrates an embodiment of a transaction sequence for generating a tree having nodes to reference stack trace information. In one embodiment, profiling/trace component 702 (e.g., allocation trace 316) requests a stack ID for a stack of the current thread 802 from a VM (e.g., backend VM 206) via profiling infrastructure having ID service 310. The profiling infrastructure also contains profiling/trace component 702, such as allocation trace 316. At ID service 310, the stack for the current thread is obtained 804. Then, find the part of the stack (e.g., the bottom of the stack) that is the same as for the last stack identified in the thread 806. ID service 310, using tree generation module, facilitates the generation of tree starting at the node in the tree that corresponds to the topmost matching frame in the last stack 808. The tree is then traversed up to the topmost stack frame and new nodes are inserted in or added to the tree, as needed 810. If the tree has grown too large, the tree is cleared and the starts from the beginning 812. In another embodiment, certain unused or unnecessary nodes of the tree are removed to make space for new nodes. If the node for the topmost stack frame has no associated ID, a new ID is assigned to the node 814. In one embodiment, IDs of the stack traces in frames correspond to the IDs assigned to the nodes in the tree. The ID of the topmost node is returned 816 via ID service 310. The stack ID is returned 818 to the profiling/trace component 702.

Figure 9:
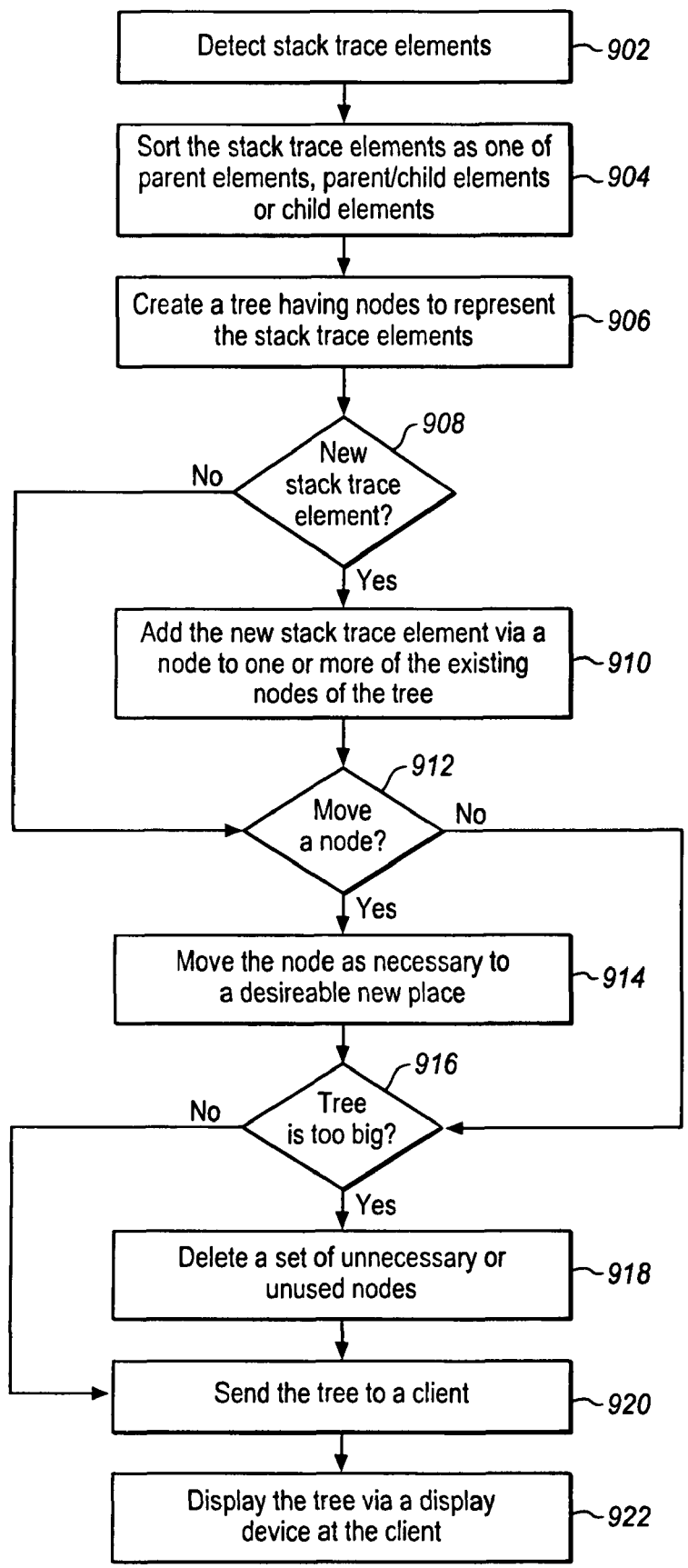
FIG. 9 illustrates an embodiment of a process for generating a tree having nodes to reference stack trace information.

FIG. 9 illustrates an embodiment of a process for generating a tree having nodes to reference stack trace information. In one embodiment, at processing block 902, stack traces and their stack trace elements are detected and identified. Stack trace elements relate to stack traces that are detected while performing profiling (e.g., allocation trace using allocation module 316, loitering trace using loitering trace module 318, garbage collection using garbage collection trace module 320, allocation statistic trace, debugging, etc.) of an application (e.g., Java application) that is running or being executed at a virtual machine (e.g., backend VM 206 (the profiling VM)) at a server. A stack trace element may refer to any stack trace-related piece of information, such as, but not limited to, a component, a module, an event, a segment of a stack trace, one or more segments of one or more stack traces, one or more stack traces, and the like. A stack trace element may be determined by a user (e.g., developer, administrator, programmer, etc.) via the client or automatically at the server. The server may include a Java application server having a J2EE engine wherein the VM may reside. The profiling of the application may have been requested or initiated by a user via a virtual machine (e.g., frontend VM 214) at a client that is in communication with the server. Both the server-side and client-side virtual machines may include Java virtual machines. In one embodiment, the detection and identification of the stack traces is performed by an ID service module (e.g., ID service 310) provided by an on-demand profiling infrastructure (e.g., profiling infrastructure 208) at the underlying virtual machine at the server.

At processing block 904, the stack trace elements are sorted as parent elements, parent/child elements, and/or child elements as described elsewhere in this document. A tree generation module working with the ID service creates a tree or tree-like hierarchical structure (e.g., TST) is generated at processing block 906. The tree includes nodes that are used to represent the detected and identified stack trace elements. The tree may be generated one node at a time and remain dynamic with changing profiling and stack trace information, system requirements, and user needs or desires, saving memory, saving CPU time, and the like. At decision block 908, whether any additional stack trace elements are detected and identified and that are to be added to the tree is determined. If yes, one or more nodes representing the new stack trace elements are added to the tree at processing block 910. The addition of new nodes is performed using anode addition/movement module of the tree generation module. If not, the process continues with decision block 912, where a determination is made as to whether any nodes are to be moved within the tree. This may be done for various reasons, changing stack trace information, changing profiling, user choice, system choice, providing a better and more efficient representation of the tree, saving memory, saving CPU time, and the like. If yes, the nodes that are to be moved are moved to a better or more desirable place in the tree by linking the moving nodes to one or more existing nodes, as necessary, at processing block 914. The move is performed using the node addition/movement module of the tree generation module. If not, the process continues with decision block 916, where a determination is made as to whether the tree has become to large having unnecessary or unwanted or unused nodes. If yes, in one embodiment, one or more nodes that are unnecessary or unwanted or unused are removed from the tree. In another embodiment, the entire tree may be deleted and recreated with necessary and desirable nodes, such as when this process saves more memory and/or CPU time than simply removing the nodes from the tree. If not, the process continues with processing block 918 by sending the tree to the virtual machine at the client. At processing block 920, the tree is then displayed via a viewer or display device coupled to the client for the user to view and evaluate the tree.

Figure 10:
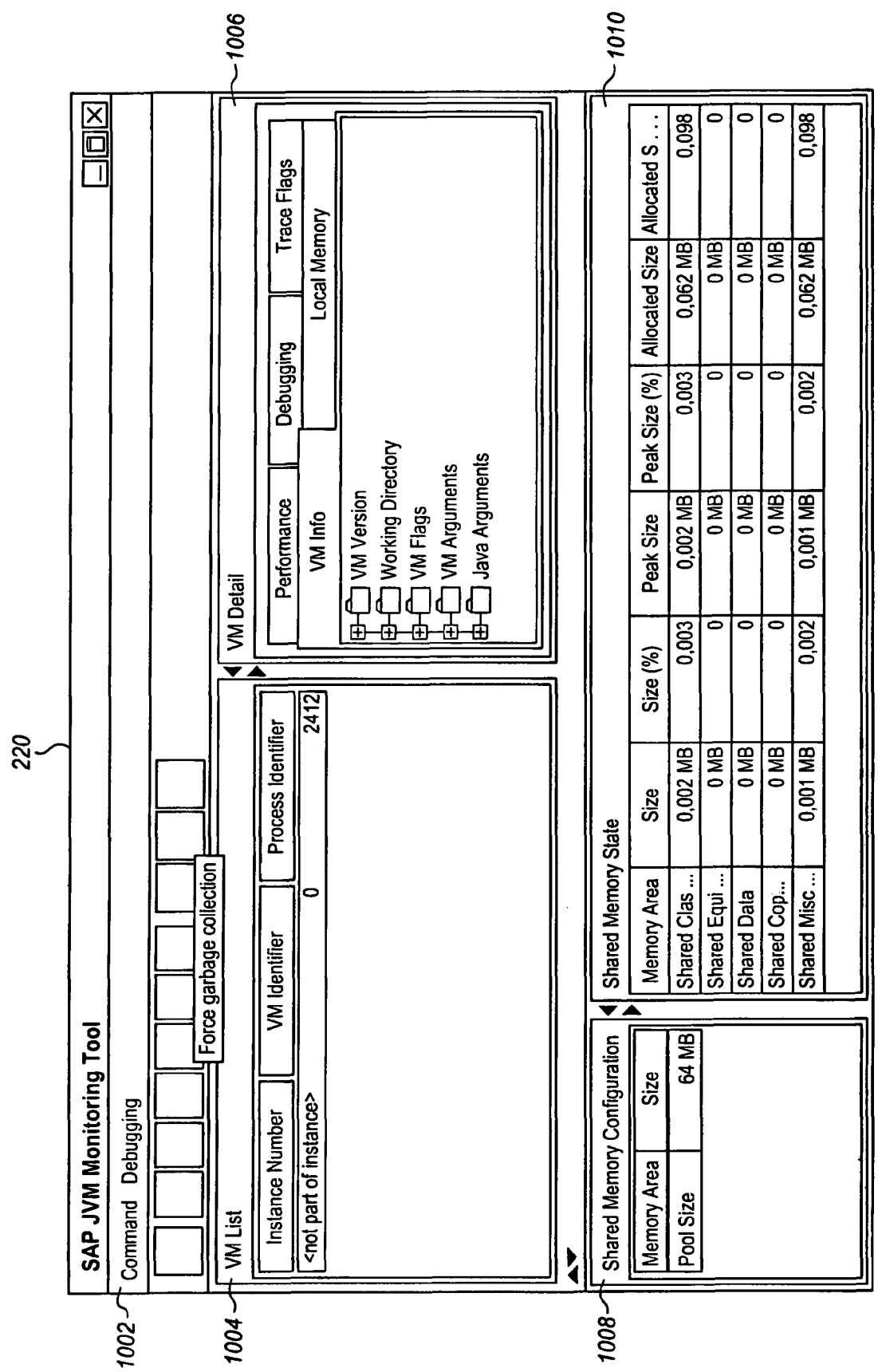
FIG. 10 illustrates an embodiment of a monitoring tool.

FIG. 10 illustrates an embodiment of a monitoring tool 220. The illustrated monitoring tool 220 includes a JVM monitoring tool (e.g., SAP JVM monitoring tool). Monitoring tool 220 includes a menu line 1002 that includes various menu items, such as command, debugging, etc. Monitoring tool 220 further provides a list of VMs 1004, and details about any VM 1006 which includes a number of items, such as performance, VM info, debugging, trace flags, local memory, etc. Monitoring tool 220 further provides shared memory configuration 1008 and shared memory state 1010. Monitoring tool 220 is illustrated merely as an example and the embodiment of the present invention are in no way limited to using the illustrated monitoring tool 220.

Processes taught by the discussion above may be performed with program code, such as machine-executable instructions, which can cause a machine (such as a "virtual machine", a general-purpose processor disposed on a semiconductor chip, a special-purpose processor disposed on a semiconductor chip, etc.) to perform certain functions. Alternatively, these functions may be performed by specific hardware components that contain hardwired logic for performing the functions, or by any combination of programmed computer components and custom hardware components.

One or more modules, components, or elements described throughout this document, such as the ones shown within or associated with the on-demand profiling infrastructure 206 of profiling mechanism 200 of FIG. 2, may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above. The code may also be downloaded from a remote computer (e.g., a server) to a requesting computer (e.g., a client) by way of data signals embodied in a propagation medium (e.g., via a communication link (e.g., a network connection)).

Figure 11:
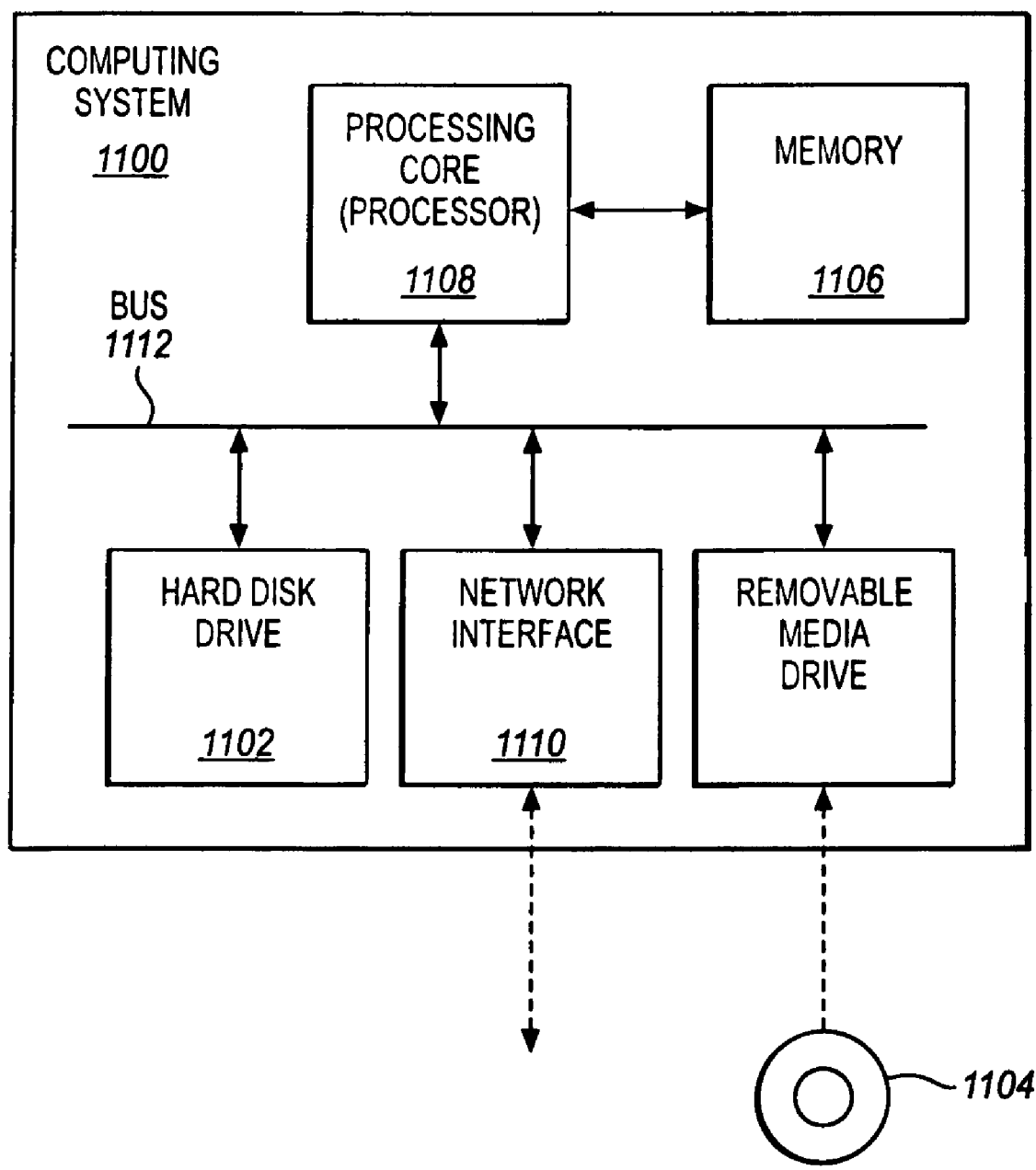
FIG. 11 illustrates an embodiment of a computing system.

FIG. 11 illustrates an embodiment of a computing system 1100. Computing system 1100 may be used for implementing one or more embodiments of the present invention and for executing program code stored by an article of manufacture. It is important to recognize that the computing system 1100 represents merely of various computing system architectures that can be used for the same purposes. The applicable article of manufacture may include one or more fixed components (such as hard disk drive 1102 or memory 1106) and/or various movable components, such as compact disk (CD) ROM 1104, a compact disc, a magnetic tape, and the like. To execute the program code, typically instructions of the program code are loaded into RAM 1106. Then, processing core 1108 executes the instructions. A processing core may include one or more processors and a memory controller function. A virtual machine or "interpreter" (e.g., JVM) may run on top of the processing core (architecturally speaking) to convert abstract code (e.g., Java bytecode) into instructions that are understandable to the specific processor(s) of processing core 1108. Computing system 1100 further includes network interface 1110 and bus 1112 to connect to other systems via a network and to have various components communicate with each other, respectively.

Figure 12:
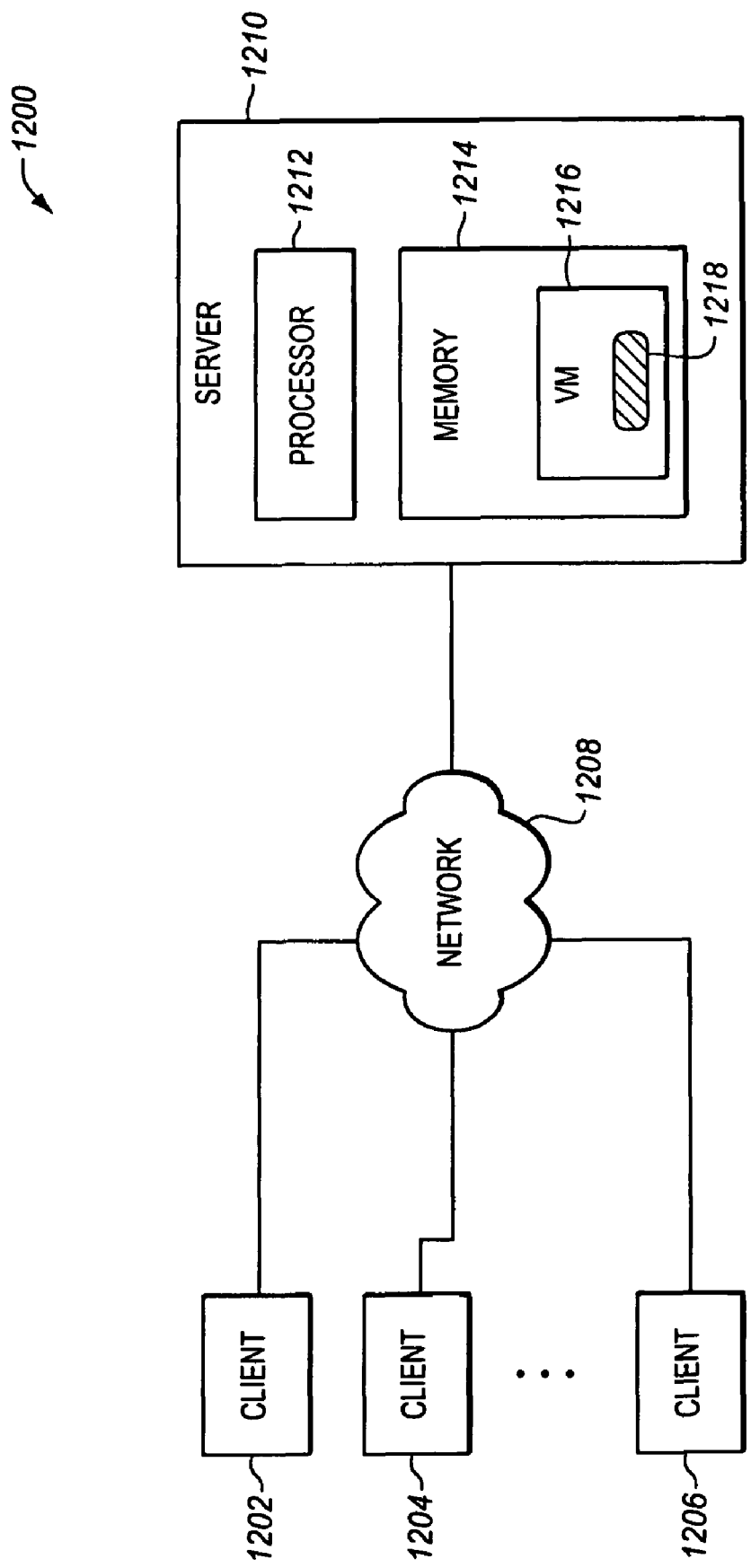
FIG. 12 illustrates an embodiment of a client/server network system employing a message enhancement mechanism.

FIG. 12 illustrates an embodiment of a client/server network system 1200 employing an on-demand profiling infrastructure 1218. As illustrated, network 1208 links server 1210 with client systems 1202-1206. Server 1210 includes programming data processing system suitable for implementing apparatus, programs, and/or methods in accordance with one or more embodiments of the present invention. Server 1210 includes processor 1212 and memory 1214. Server 1210 provides a core operating environment for one or more runtime systems (e.g., VM 1216) at memory 1214 to process user requests. Memory 1214 may include a shared memory area that is accessible by multiple operating system processes executing in server 1210. For example, VM 1216 may include an enterprise server (e.g., a J2EE-compatible server or node, Web Application Server developed by SAP AG, WebSphere Application Server developed by IBM Corp. of Armonk, N.Y., and the like). The enterprise server at VM 1216 may host the on-demand profiling infrastructure 1218. Memory 1214 can be used to store an operating system, a Transmission Control Protocol/Internet Protocol (TCP/IP) stack for communicating over network 1208, and machine executable instructions executed by processor 1212. In some embodiments, server 1210 may include multiple processors, each of which can be used to execute machine executable instructions.

Client systems 1202-1206 may execute multiple application or application interfaces. Each instance or application or application interface may constitute a user session. Each user session may generate one or more requests to be processed by server 1210. The requests may include instructions or code to be executed on a runtime system, such as VM 1216, on server 1210, such as the requests made via the on-demand profiling infrastructure 1218 and its components and modules as described throughout this document.

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer-implemented method comprising:
identifying stack trace elements in stack traces relating to profiling of a software application capable of being executed at a first virtual machine of a first computing system, wherein each stack trace element corresponds to a profiling event occurring during profiling;
detecting frequency and relationship status of the stack trace elements, wherein the frequency refers to a number of times each stack trace element appears in the stack traces in response to occurrence of a profiling event;
sorting the stack trace elements based on the detected frequency and the relationship status; and
dynamically generating a hierarchical tree having nodes representing the sorted stack trace elements as parent nodes, parent/child nodes, and child nodes, wherein the parent nodes refer to parent stack trace elements that appear more frequently than parent/child nodes referring to parent/child stack traces and child nodes referring to child stack traces, and wherein the parent/child stack traces appear more frequently than the child stack traces, and dynamically adjusting the hierarchical tree in response to changes in the frequency and the relationship status, wherein dynamically adjusting includes re-sorting the stack trace elements and correspondingly performing at least one of relocating one or more nodes, adding or removing one or more nodes, or renaming one or more nodes such that the hierarchical tree continues to represent the detected frequency and relationship status of the sorted stack trace elements.

2. The computer-implemented method of claim 1, further comprising communicating the hierarchical tree to a second virtual machine at the first computing system or a second computing system.

3. The computer-implemented method of claim 1, further comprising displaying the hierarchical tree via a display device coupled to the first computing system or a second computing system.

4. The computer-implemented method of claim 1, wherein each of the parent stack trace elements appears in two or more stack traces.

5. The computer-implemented method of claim 1, wherein each of the parent/child stack trace element appears in one or more stack traces.

6. The computer-implemented method of claim 1, wherein each of the child stack trace element appears in one or more stack traces.

7. The computer-implemented method of claim 1, wherein the relationship status reveals a frequency at which each stack trace element appears in comparison to other stack trace elements.

8. A system comprising:
a first computing system having a memory to store instructions for generating a hierarchical tree, and a processing device to execute the instructions, wherein the instructions cause the processing device to:
identify stack trace elements in stack traces relating to profiling of a software application capable of being executed at a first virtual machine of a first computing system, wherein each stack trace element corresponds to a profiling event occurring during profiling;
detect frequency and relationship status of the stack trace elements, wherein the frequency refers to a number of times each stack trace element appears in the stack traces in response to occurrence of a profiling event;
sort the stack trace elements based on the detected frequency and the relationship status; and
dynamically generate a hierarchical tree having nodes representing the sorted stack trace elements as parent nodes, parent/child nodes, and child nodes, wherein the parent nodes refer to parent stack trace elements that appear more frequently than parent/child nodes referring to parent/child stack traces and child nodes referring to child stack traces, and wherein the parent/child stack traces appear more frequently than the child stack traces, and dynamically adjusting the hierarchical tree in response to changes in the frequency and the relationship status, wherein dynamically adjusting includes re-sorting the stack trace elements and correspondingly performing at least one of relocating one or more nodes, adding or removing one or more nodes, or renaming one or more nodes such that the hierarchical tree continues to represent the detected frequency and relationship status of the sorted stack trace elements.

9. The system of claim 8, wherein the processing device is further to communicate the hierarchical tree to a second virtual machine at the first computing system or a second computing system.

10. The system of claim 8, wherein the processing device is further to display the hierarchical tree via a display device coupled to the first computing system or a second computing system.

11. The system of claim 8, wherein each of the parent stack trace elements appears in two or more stack traces.

12. The system of claim 8, wherein each of the parent/child stack trace element appears in one or more stack traces.

13. The system of claim 8, wherein each of the child stack trace element appears in one or more stack traces.

14. The system of claim 8, wherein the relationship status reveals a frequency at which each stack trace element appears in comparison to other stack trace elements.

15. A non-transitory machine-readable medium including instructions that, when executed by a processing device, cause the processing device to perform a method, the method comprising:
identifying stack trace elements in stack traces relating to profiling of a software application capable of being executed at a first virtual machine of a first computing system, wherein each stack trace element corresponds to a profiling event occurring during profiling;
detecting frequency and relationship status of the stack trace elements, wherein the frequency refers to a number of times each stack trace element appears in the stack traces in response to occurrence of a profiling event;
sorting the stack trace elements based on the detected frequency and the relationship status; and
dynamically generating a hierarchical tree having nodes representing the sorted stack trace elements as parent nodes, parent/child nodes, and child nodes, wherein the parent nodes refer to parent stack trace elements that appear more frequently than parent/child nodes referring to parent/child stack traces and child nodes referring to child stack traces, and wherein the parent/child stack traces appear more frequently than the child stack traces, and dynamically adjusting the hierarchical tree in response to changes in the frequency and the relationship status, wherein dynamically adjusting includes re-sorting the stack trace elements and correspondingly performing at least one of relocating one or more nodes, adding or removing one or more nodes, or renaming one or more nodes such that the hierarchical tree continues to represent the detected frequency and relationship status of the sorted stack trace elements.

16. The non-transitory machine-readable medium of claim 15, wherein the method further comprises communicating the hierarchical tree to a second virtual machine at the first computing system or a second computing system.

17. The non-transitory machine-readable medium of claim 15, wherein the method further comprises displaying the hierarchical tree via a display device coupled to the first computing system or a second computing system.

18. The non-transitory machine-readable medium of claim 15, wherein each of the parent stack trace elements appears in two or more stack traces.

19. The non-transitory machine-readable medium of claim 15, wherein each of the parent/child stack trace element appears in one or more stack traces.

20. The non-transitory machine-readable medium of claim 15, wherein each of the child stack trace element appears in one or more stack traces.

21. The non-transitory machine-readable medium of claim 15, wherein the relationship status reveals a frequency at which each stack trace element appears in comparison to other stack trace elements.

* * * * *